United States Patent
Ramsland

(10) Patent No.: US 9,771,923 B1
(45) Date of Patent: Sep. 26, 2017

(54) HUB ASSEMBLY FOR HORIZONTAL AXIS, FLUID-DRIVEN TURBINE ENABLING TEETERING

(71) Applicant: Arnold Ramsland, Chapel Hill, NC (US)

(72) Inventor: Arnold Ramsland, Chapel Hill, NC (US)

( * ) Notice: Subject to any disclaimer, the term of this patent is extended or adjusted under 35 U.S.C. 154(b) by 0 days.

(21) Appl. No.: 15/395,497

(22) Filed: Dec. 30, 2016

(51) Int. Cl.
    *F03D 7/02*     (2006.01)
    *F03D 1/06*     (2006.01)
    *F03D 80/70*     (2016.01)

(52) U.S. Cl.
    CPC .......... *F03D 7/0224* (2013.01); *F03D 1/0658* (2013.01); *F03D 1/0691* (2013.01); *F03D 80/70* (2016.05); *F05B 2240/221* (2013.01); *F05B 2260/98* (2013.01)

(58) Field of Classification Search
    CPC ...... F03D 7/0224; F03D 1/0691; F03D 80/70; F03D 1/0658; F05B 2260/98; F05B 2240/221; F03B 3/14; F03B 3/145; F03B 3/12; F03B 3/121; F03B 3/123
See application file for complete search history.

(56) References Cited

U.S. PATENT DOCUMENTS

| | | | |
|---|---|---|---|
| 756,616 | A | 4/1904 | Fornander |
| 2,050,764 | A | 8/1936 | Rogers |
| 2,105,315 | A | 1/1938 | Finch |
| 4,068,131 | A | 1/1978 | Jacobs et al. |
| 4,423,333 | A * | 12/1983 | Rossman ............. F03D 7/0224 290/44 |
| 6,923,615 | B2 | 8/2005 | Crinion |
| 7,806,799 | B2 * | 10/2010 | Smook .................. F16H 1/2836 475/344 |
| 8,246,302 | B2 | 8/2012 | Bertolotti |

(Continued)

FOREIGN PATENT DOCUMENTS

| CN | 202228267 U | 5/2012 |
|---|---|---|
| SU | 1550209 A1 | 3/1990 |
| UA | 76785 C2 | 11/2005 |

OTHER PUBLICATIONS

Ramsland, Arnold; Description and Computer Modeling of a Ball-and-Socket Hub That Enables Teetering for Three-Bladed Wind Turbines, J. Sol. Energy Eng. 137(3), 031019-1 to 031019-12, American Society of Mechanical Engineers, Jun. 1, 2015.

(Continued)

*Primary Examiner* — Gregory Anderson
*Assistant Examiner* — Eldon Brockman
(74) *Attorney, Agent, or Firm* — Withrow & Terranova, P.L.L.C.; Vincent K. Gustafon

(57) ABSTRACT

A hub assembly permits a rotor portion of a horizontal axis, fluid-driven turbine (e.g., with three or more blades) to teeter relative to a hub shaft. An outer hub member configured to receive turbine blades is permitted to rotate relative to the inner hub member. Multiple rocker members interposed between the inner hub member and the outer hub member include curved end surfaces that are configured to permit pivotal movement between the rocker members and corresponding features protruding from a hub shaft of the inner hub member. Torque receiving surfaces associated with features protruding from the hub shaft are permitted to slide relative to torque transmitting surfaces of the rocker members.

25 Claims, 13 Drawing Sheets

(56) References Cited

U.S. PATENT DOCUMENTS

| | | | |
|---|---|---|---|
| 8,398,369 | B2 | 3/2013 | Rebsdorf et al. |
| 8,708,654 | B2 | 4/2014 | Ramsland |
| 8,770,934 | B2 | 7/2014 | Perkinson |
| 9,194,366 | B2 | 11/2015 | Ramsland |
| 2006/0159550 | A1 | 7/2006 | Nagao |
| 2006/0160655 | A1* | 7/2006 | Smook ................ F16H 1/2836 475/331 |
| 2008/0274849 | A1* | 11/2008 | Smook ................ F16H 1/2836 475/11 |
| 2008/0304969 | A1 | 12/2008 | Fu |
| 2011/0142627 | A1 | 6/2011 | Perkinson |
| 2012/0063901 | A1 | 3/2012 | Matsuda et al. |
| 2012/0070286 | A1 | 3/2012 | Carter |
| 2012/0070304 | A1 | 3/2012 | Nielsen et al. |
| 2012/0099993 | A1 | 4/2012 | Guerenbourg et al. |
| 2013/0045101 | A1 | 2/2013 | Ramsland |
| 2014/0127018 | A1* | 5/2014 | Pasquet ................ F03D 7/0224 416/153 |

OTHER PUBLICATIONS

Jonkman, Jason M. et al.; FAST User's Guide, Technical Report NREL/EL-500-38230, Aug. 2005, National Renewable Energy Laboratory, Golden, Colorado.

Jonkman, J.M.; Dynamics Modeling and Loads Analysis of an Offshore Floating Wind Turbine, Technical Report NREL/TP-500-41958, Nov. 2007, National Renewable Energy Laboratory, Golden, Colorado.

Jonkman, B. J. et al.; TurbSim User's Guide, Technical Report NREL/TP-500-39797, Sep. 2006, National enewable Energy Laboratory, Golden, Colorado.

\* cited by examiner

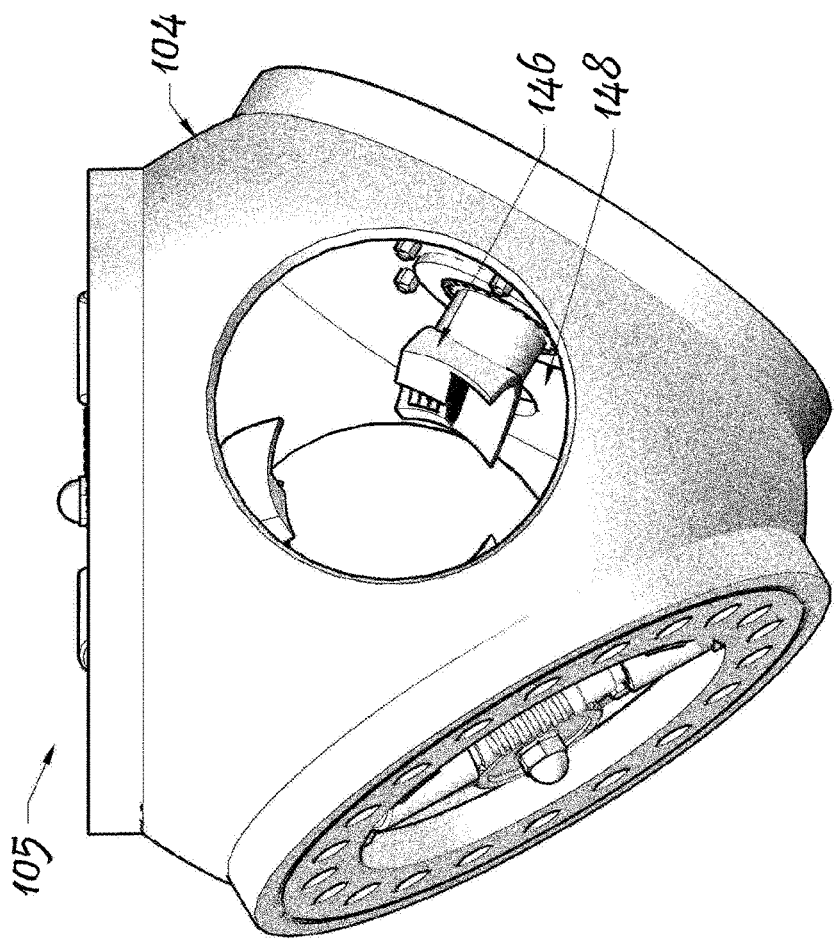
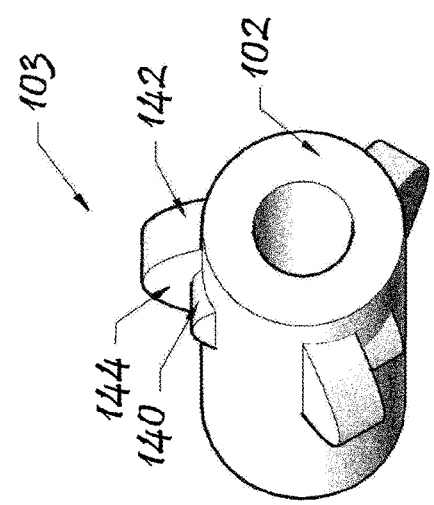

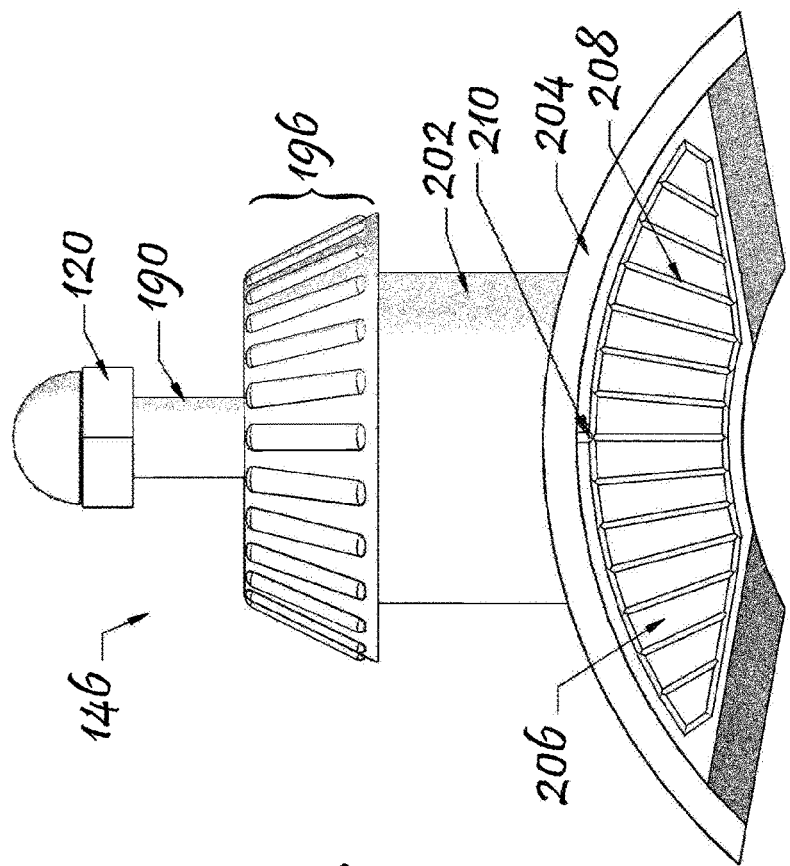
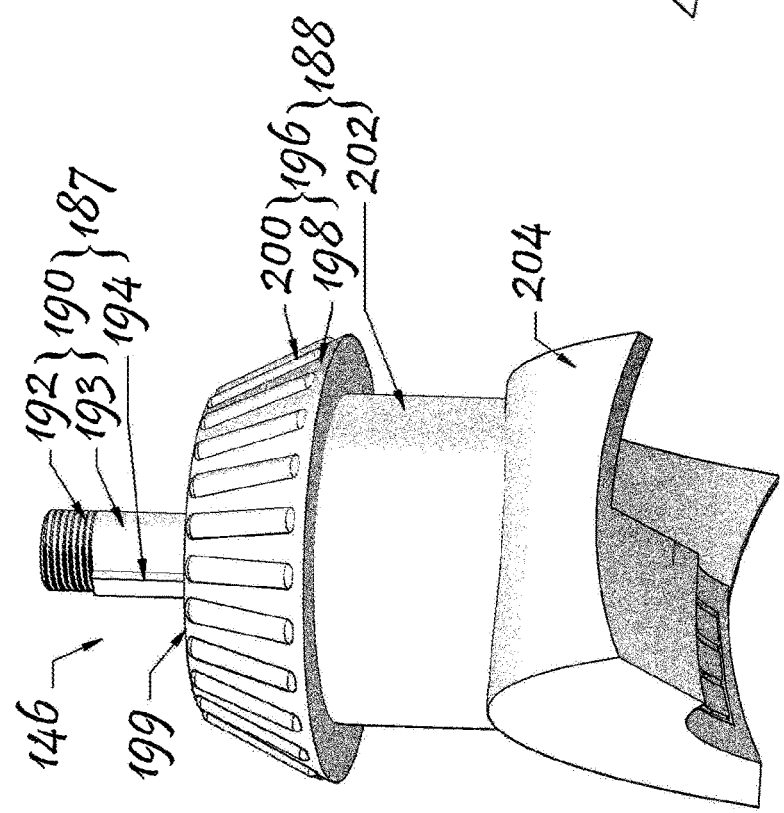
Fig. 8
Fig 7

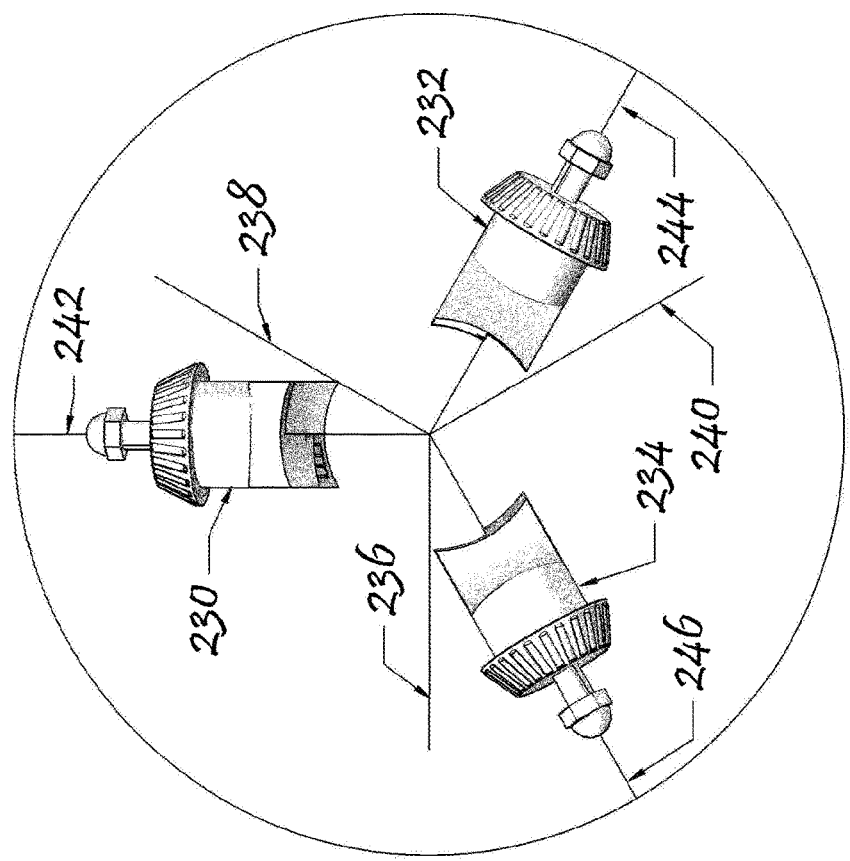
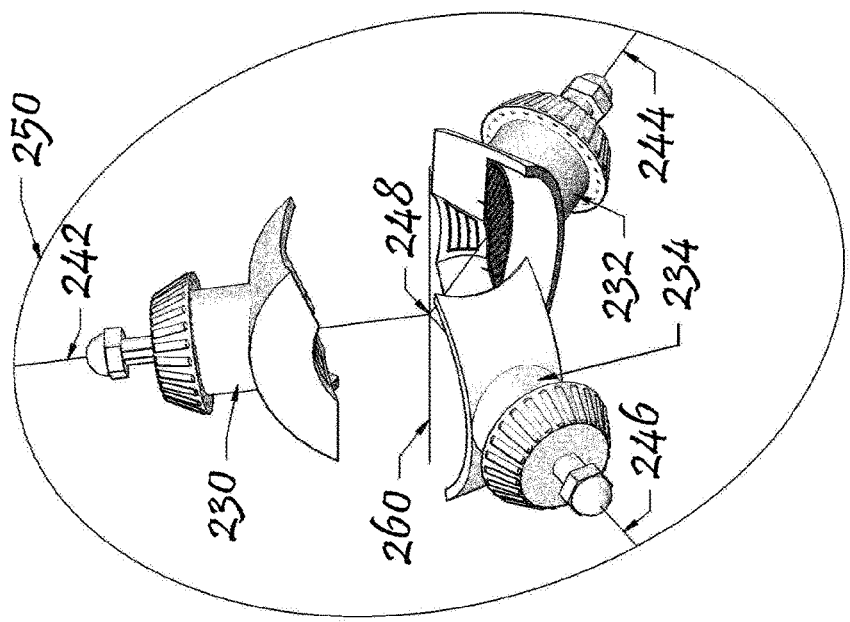
Fig. 14
Fig. 15 ns from the design of the wind turbine, then it will subject the components of the wind turbine to damaging stresses during rotary operation.
HUB ASSEMBLY FOR HORIZONTAL AXIS, FLUID-DRIVEN TURBINE ENABLING TEETERING

TECHNICAL FIELD

The present disclosure relates to horizontal axis fluid-driven (e.g., wind) turbines, and in particular to turbines that enable teetering of turbine blades.

BACKGROUND

One of the principal problems involved in designing horizontal axis wind turbines is wind shear, which is the variation of wind velocity with height above ground level. Wind velocities tend to increase with altitude due to aerodynamic surface drag and the viscosity of air. As a result, turbine blades at the top of a rotary path experience higher wind velocities than blades at the bottom of the rotary path. If this vertical wind velocity gradient is not addressed in the design of the wind turbine, then it will subject the components of the wind turbine to damaging stresses during rotary operation.

In addition to wind shear due to natural differences in wind velocity with altitude, wind shear can also be induced by improper alignment of the main shaft axis, i.e., not placing the axis at the optimal angle with respect to wind direction. Most often, improper alignment results from changes in wind direction. If there is no wind shear, the rotor axis (the axis around which the blades rotate) should face directly into the wind so that all blades will experience the same wind speed. If however, the main shaft axis is aligned obliquely to the wind in one direction, blades at the top of the rotation move into the wind, and blades at the bottom of the rotation will move with the wind. This will cause blades at the top of the rotation to experience a greater effective wind speed than blades at the bottom. Conversely, if the orientation of the main shaft axis is oblique to the wind in the opposite direction, blades at the bottom of the rotation will experience a greater effective wind speed than those at the top. Other sources of wind shear include wind turbulence, shadowing from a turbine's own tower as well as shadowing from neighboring turbines (e.g., for wind turbines located within a wind farm). Additionally, for turbines deployed in aqueous environments, there are significant differences in the flow rate of the water. Typically water at the top of a flowing stream runs faster than water at the bottom of the stream.

The lift generated by turbine blades during rotation is applied both in the direction of rotation and in a backward direction. Forces applied in the direction of rotation are designated as in-plane forces and forces applied in a backward direction are designated as out-of-plane forces. Because of this, wind shear will cause more backward force to be applied to blades experiencing the greater effective wind speed. With a rigid hub, the unbalance in backward forces creates a cyclical stress on the blades and bearings that can cause excessive wear and maintenance problems, and can shorten the useful life of the wind turbine generator.

One approach for addressing the problems associated with wind shear involves use of a hub incorporating a "teeter pin" that enables a turbine rotor to pivot back-and-forth like a playground seesaw. This back-and-forth rotation results in balancing of the torque on the blades around a teeter axis because blades experiencing higher wind velocity move with the wind and blades experiencing lower wind velocity move into the wind. Such teeter pins are useful as applied to two-bladed wind turbines, as they allow the upper blade to tilt backward while the lower blade tilts forward. Thus, the teetering motion of a two-bladed wind turbine tends to equalize the effective wind speeds for both blades, thereby maintaining a more constant tip speed ratio. The pivotal movement enabled by teeter pins, however, is inadequate to compensate for wind shear in turbines having three or more blades. This is because teetering is limited to one blade moving forward and the other moving backward in an equal and opposite manner across a single rotating teeter axis.

Another approach for addressing problems associated with wind shear involves use of a ball-and-socket hub that enables teetering of a turbine rotor with three or more blades, such as described in U.S. Pat. Nos. 8,708,654 and 9,194,366. A three-bladed design is widely considered to be the optimal configuration for large horizontal axis wind turbines. A paper authored by the inventor of this application and published in the Journal of Solar Energy Engineering 137(3) in June 2015 describes computer modeling of a ball-and-socket hub that enables teetering for three-bladed wind turbines. Such modeling showed that a three-bladed turbine with a teetering hub provides very significant reductions in the bending loads applied to the main shaft in comparison to a three-bladed turbine with a rigid hub. This is because teetering largely eliminates the cyclic variations in torque that are present with rigid hubs. A lifetime fatigue study using a rainflow counting of multi-axial torque applied to the blade root showed that a three-bladed turbine with a teetering hub provides for an approximate six-fold reduction in lifetime blade damage in comparison to a three-bladed turbine with a rigid hub. The modeling also showed that a three-bladed turbine with a teetering hub provides significant benefits in comparison to a two-bladed turbine with a teetering hub. This is because addition of a third blade reduces all loads applied to the blades by one-third. The lifetime fatigue study showed a teetering, three-bladed turbine provided an approximate four-fold reduction in lifetime blade damage in comparison to a teetering, two-bladed wind turbine.

Subsequent computer modeling and finite element analysis performed on a teetering, three-bladed turbine with a ball-and-socket hub determined that the ball-and-socket teetering hub design would likely be limited to small wind turbine applications because it does not provide sufficient strength to withstand the loads applied by a very large wind turbine (5 MW). Additionally, the ball and socket design requires considerable mass and presents significant manufacturing challenges for large wind turbines. An additional disadvantage of the ball-and-socket hub design is that it provides limited options for improving the strength of the hub because all parts have to be incorporated into either the ball or socket.

In view of the foregoing, it would be desirable to provide a new design that is superior to the ball-and-socket hub design. Accordingly, there is a need for fluid-driven turbine hubs that enable teetering of three or more blades, that can be manufactured with reduced mass and cost, that are suitable for large turbine-generator systems (e.g., capable of generating approximately 100 kW or more), and that overcome limitations associated with conventional devices.

SUMMARY

The present disclosure relates to a hub assembly that permits a rotor portion of a horizontal axis, fluid-driven turbine (e.g., including three or more turbine blades) to teeter without use of a ball-and-socket hub, utilizing a design that may be readily implemented with large scale turbines. An inner hub member includes a hub shaft that is coupleable to a generator. An outer hub member configured to receive turbine blades is configured to rotate relative to the inner hub member. Multiple rocker members interposed between the inner hub member and the outer hub member include curved end surfaces that are configured to permit pivotal movement between the rocker members and corresponding features protruding from a hub shaft of the inner hub member, thereby permitting the outer hub member to teeter relative to the hub shaft of the inner hub member.

In one aspect, a hub assembly for use with a horizontal axis, fluid-driven turbine generator includes: an outer hub member including a hub shell incorporating a plurality of torque transfer plates and including a plurality of turbine blade connectors, wherein each turbine blade connector of the plurality of turbine blade connectors is configured to receive a turbine blade; an inner hub member comprising a hub shaft, a plurality of hub shaft pivot members protruding outward from an outer surface of the hub shaft, and a plurality of torque receiving surfaces, wherein: the hub shaft is configured to transmit torque to promote rotation of a generator of a horizontal axis, fluid-driven turbine; each torque receiving surface of the plurality of torque receiving surfaces is arranged along a different plane of a plurality of intersecting planes extending through a central longitudinal axis of the hub shaft, each hub shaft pivot member of the plurality of hub shaft pivot members includes a curved outer surface, and each hub shaft pivot member and each torque receiving surface is arranged within an interior of the outer hub member; and a plurality of rocker members, wherein each rocker member of the plurality of rocker members includes (i) an outer portion that couples with a corresponding turbine blade connector of the plurality of turbine blade connectors, (ii) a central portion arranged to extend through a central aperture defined in a respective torque transfer plate of the plurality of torque transfer plates, and (iii) a rocker base arranged to extend into the interior of the outer hub member, wherein the rocker base of each rocker member comprises a first curved contact surface configured to abut a curved outer surface of a corresponding hub shaft pivot member of the plurality of hub shaft pivot members, and comprises a torque transmitting surface arranged to abut a torque receiving surface of the inner hub member; wherein the plurality of rocker members is configured to cooperate with the inner hub member to permit the outer hub member to teeter relative to the hub shaft while torque is transmitted from the outer hub member via the plurality of rocker members to the inner hub member.

In certain embodiments, lateral portions of the plurality of hub shaft pivot members define the plurality of torque receiving surfaces. In certain embodiments, the curved outer surface of each hub shaft pivot member embodies a shape constituting a portion of an imaginary cylinder having a center, and each center intersects the central longitudinal axis at a single origin point.

In certain embodiments, the inner hub member further comprises a plurality of hub shaft wall members that protrudes outward from the outer surface of the hub shaft, wherein each hub shaft wall member of the plurality of hub shaft wall members includes a lateral portion defining a torque receiving surface of the plurality of torque receiving surfaces, and each hub shaft wall member includes a curved outer surface that is configured to abut a second curved contact surface of a different rocker member of the plurality of rocker members.

In certain embodiments, each first curved contact surface is arranged to slide relative to a curved outer surface of a corresponding hub shaft pivot member, and each second curved contact surface is arranged to slide relative to a curved outer surface of a corresponding hub shaft wall member, to enable each rocker member to rotate along a teetering axis to permit the outer hub member to teeter relative to the hub shaft.

In certain embodiments, the curved outer surface of each hub shaft pivot member embodies a shape constituting a portion of a first imaginary cylinder having a first center, the curved outer surface of each hub shaft wall member embodies a shape constituting a portion of a second imaginary cylinder having a second center, and each of the first center and the second center intersects the central longitudinal axis at a single origin point.

In certain embodiments, the curved outer surface of each hub shaft wall member has a larger radius than the curved outer surface of each hub shaft pivot member.

In certain embodiments, the curved outer surface of each hub shaft pivot member is arranged to receive, and comprises a slightly greater radius of curvature than, a corresponding first curved contact surface; and the curved outer surface of each hub shaft wall member is arranged to receive, and comprises a slightly greater radius of curvature than, a corresponding second curved contact surface.

In certain embodiments, each torque receiving surface embodies a transition between a hub shaft wall member of the plurality of hub shaft wall members and a hub shaft pivot member of the plurality of hub shaft pivot members.

In certain embodiments, each rocker member is associated with a corresponding turbine blade connector of the plurality of turbine blade connectors. For each rocker member and corresponding turbine blade connector, a pitch axis extends through a center of the rocker member and the corresponding turbine blade connector, whereby each pitch axis differs from each other pitch axis of each other rocker member and corresponding turbine blade connector. Each pitch axis extends through an origin point arranged within an interior of the hub shaft.

In certain embodiments, each torque transfer plate of the plurality of torque transfer plates is affixed to the hub shell, each turbine blade connector of the plurality of turbine blade connectors is arranged proximate to a corresponding torque transfer plate of the plurality of torque transfer plates, and each turbine blade connector is arranged to rotate relative to the hub shell about a pitch axis of the corresponding torque transfer plate.

In certain embodiments, the hub shell includes a rear opening having a first diameter, a portion of the hub shaft extends through the rear opening and has a second diameter, and the first diameter is sufficiently greater than the second diameter so as to permit the outer hub member to teeter relative to the hub shaft without impacting the hub shaft.

In certain embodiments, the hub assembly further includes a plurality of rocker bearings associated with the plurality of rocker members, wherein each rocker bearing is arranged within a central aperture of a different torque transfer plate of the plurality of torque transfer plates, and each rocker bearing is interposed between a central aperture of a corresponding torque transfer plate and a rocker member of the plurality of rocker members to permit rotation of the rocker member relative to the corresponding torque transfer plate.

In certain embodiments, the hub assembly further includes a plurality of slewing drive mechanisms, wherein each slewing drive mechanism of the plurality of slewing drive mechanisms is associated with a different turbine blade connector of the plurality of turbine blade connectors to control rotation of the turbine blade connector relative to a rocker member of the plurality of rocker members associated with the turbine blade connector to effectuate a change in pitch angle of a turbine blade coupled to the turbine blade connector.

In certain embodiments, each slewing drive mechanism includes a ring gear affixed to the rocker member and includes a worm gear affixed to the turbine blade connector associated with the rocker member, wherein the worm gear is configured to engage the ring gear.

In certain embodiments, each turbine blade connector of the plurality of turbine blade connectors is fitted with one or more cross supports that provide direct connection to a rocker end shaft.

In certain embodiments, the hub assembly further includes a fixed-pitch blade connector, wherein a slewing drive is eliminated and a pitch angle of the turbine blades remains fixed. In such embodiments, a cross support may provide direct connection between a rocker member and the fixed-pitch blade connector.

In certain embodiments, the hub shell includes a plurality of raised lips, each raised lip of the plurality of raised lips is arranged proximate to a different torque transfer plate of the plurality of torque transfer plates, and each raised lip is arranged to receive a portion of a turbine blade.

In certain embodiments, each torque transmitting surface is arranged to slide relative to an abutting torque receiving surface.

In certain embodiments, each rocker member comprises a hub shaft contact surface that substantially conforms to a curvature of the hub shaft and serves to limit a degree of teetering of the outer hub member relative to the hub shaft.

In certain embodiments, each rocker member comprises a lubricant reservoir and at least one of the following features (a) or (b): (a) a plurality of grooves arranged on the torque transmitting surface and configured to receive lubricant from the lubricant reservoir via a wall lubrication passage; or (b) a plurality of grooves arranged on a pivot contact surface and configured to receive lubricant from the lubricant reservoir via a pivot lubrication passage.

In certain embodiments, the plurality of torque transfer plates includes at least two torque transfer plates, the plurality of turbine blade connectors includes at least two turbine blade connectors, the plurality of hub shaft pivot members includes at least two hub shaft pivot members, the plurality of hub shaft wall members includes at least two hub shaft wall members, and the plurality of rocker members includes at least two rocker members. In certain embodiments, at least three (instead of at least two) of each one of the foregoing elements is provided.

In certain embodiments, each rocker member and corresponding turbine blade connector remain oriented along a hub shaft axis, and each rocker member and corresponding turbine blade connector are permitted to rotate about a corresponding pitch axis, during teetering of the outer hub member relative to the hub shaft.

In certain embodiments, the hub assembly further includes a flexible hub protector affixed to the hub shaft and the hub shell to prevent ingress of liquid into the interior of the outer hub member.

In another aspect, a wind turbine includes a hub assembly as disclosed herein.

In another aspect, a water turbine includes a hub assembly as disclosed herein.

In another aspect, a method for generating electric power includes operation of a horizontal axis, fluid-driven turbine generator incorporating a hub assembly as disclosed herein.

Those skilled in the art will appreciate the scope of the present disclosure and realize additional aspects thereof after reading the following detailed description of the preferred embodiments in association with the accompanying drawing figures.

BRIEF DESCRIPTION OF DRAWINGS

The accompanying drawings incorporated in and forming a part of this specification illustrate several aspects of the disclosure, and together with the description serve to explain the principles of the disclosure.

FIG. 3 is a perspective view of at least a portion of an inner hub member useable within a subassembly as shown in FIG. 4.

FIG. 4 is a front perspective view of a subassembly of the hub assembly of FIG. 1, including three rocker members received by a hub shell.

FIG. 7 is a perspective view of a rocker member as previously illustrated in FIGS. 4 and 6.

FIG. 8 is a side elevation view of the rocker member of FIG. 7 with a nut received by a threaded end of the rocker member.

FIG. 14 is a front view of the three rocker members and pitch and teetering axes of FIG. 12 showing no change in pitch angle of the second and third rocker members, in contrast to the configuration of FIG. 12.

FIG. 15 is a perspective view of the three rocker members and pitch axes of FIG. 14, showing a positive ten degree rotation of a first rocker member as well as negative five degree rotation of the second and third rocker members.

DETAILED DESCRIPTION

Figure 1:
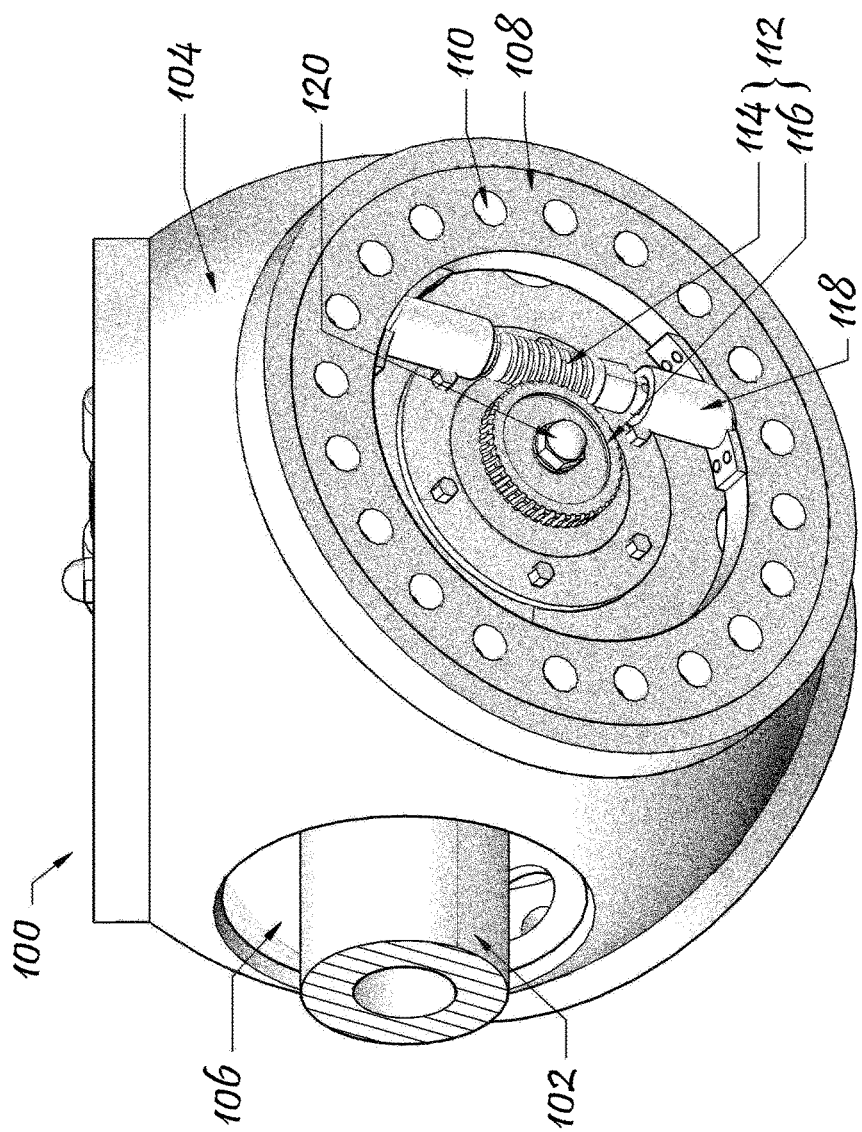
FIG. 1 is a perspective view of the exterior of at least a portion of a hub assembly for a horizontal axis, fluid-driven turbine generator, the hub assembly including an inner hub member and three rocker members (not shown) arranged within an outer hub assembly arranged to receive three turbine blades.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It should be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It should also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It should be understood that, although the terms "upper," "lower," "bottom," "intermediate," "middle," "top," and the like may be used herein to describe various elements, these elements should not be limited by these terms. These terms are only used to distinguish one element from another. For example, a first element could be termed an "upper" element and, similarly, a second element could be termed an "upper" element depending on the relative orientations of these elements, without departing from the scope of the present disclosure.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having meanings that are consistent with their meanings in the context of this specification and the relevant art and will not be interpreted in an idealized or overly formal sense unless expressly so defined herein.

The present disclosure relates to a hub assembly that permits a rotor portion of a horizontal axis, fluid-driven turbine (e.g., including three or more turbine blades) to teeter without use of a ball-and-socket hub, utilizing a design that may be readily implemented with very large scale turbines. An inner hub member includes a hub shaft that is coupleable to a generator. An outer hub member configured to receive turbine blades is configured to rotate relative to the inner hub member. Multiple rocker members interposed between the inner hub member and the outer hub member include curved end surfaces that are configured to permit pivotal movement between the rocker members and corresponding features protruding from a hub shaft of the inner hub member, thereby permitting the outer hub member to teeter relative to the hub shaft of the inner hub member.

Preferred embodiments of the present disclosure will now be described with reference to the drawings. Identical elements in the various figures are identified, to the extent possible, with the same reference numerals.

FIG. 1 is a perspective view of the exterior of at least a portion of a hub assembly 100 for a horizontal axis, fluid-driven turbine generator arranged to receive three turbine blades, as viewed from the left/rear. As shown, a hub shaft 102 extends through a hub shell opening 106 arranged along a rear of a hub shell 104. The diameter of the hub shell opening 106 is somewhat greater than the diameter of the hub shaft 102 in order to provide room for limited teetering of the hub shell 104. No teetering deflections are shown in FIG. 1, as evidenced by the uniform distance between the hub shaft 102 and the hub shell opening 106. FIG. 1 shows a turbine blade connector 108 fitted within the hub shell 104. The turbine blade connector 108 has a series of blade connector holes 110 used for connection to a turbine blade (not shown) using fasteners (not shown). In this embodiment, it is possible to change the pitch angle of a turbine blade received by the turbine blade connector 108 by use of a slewing drive 112. The slewing drive 112 includes a ring gear 116 arranged to cooperate with a worm gear 114. The worm gear 114 is affixed to the turbine blade connector 108 by means of one or more worm supports 118. The ring gear 116 is fastened to an underlying rocker member (not shown) by means of a ring gear nut 120.

Figure 2:
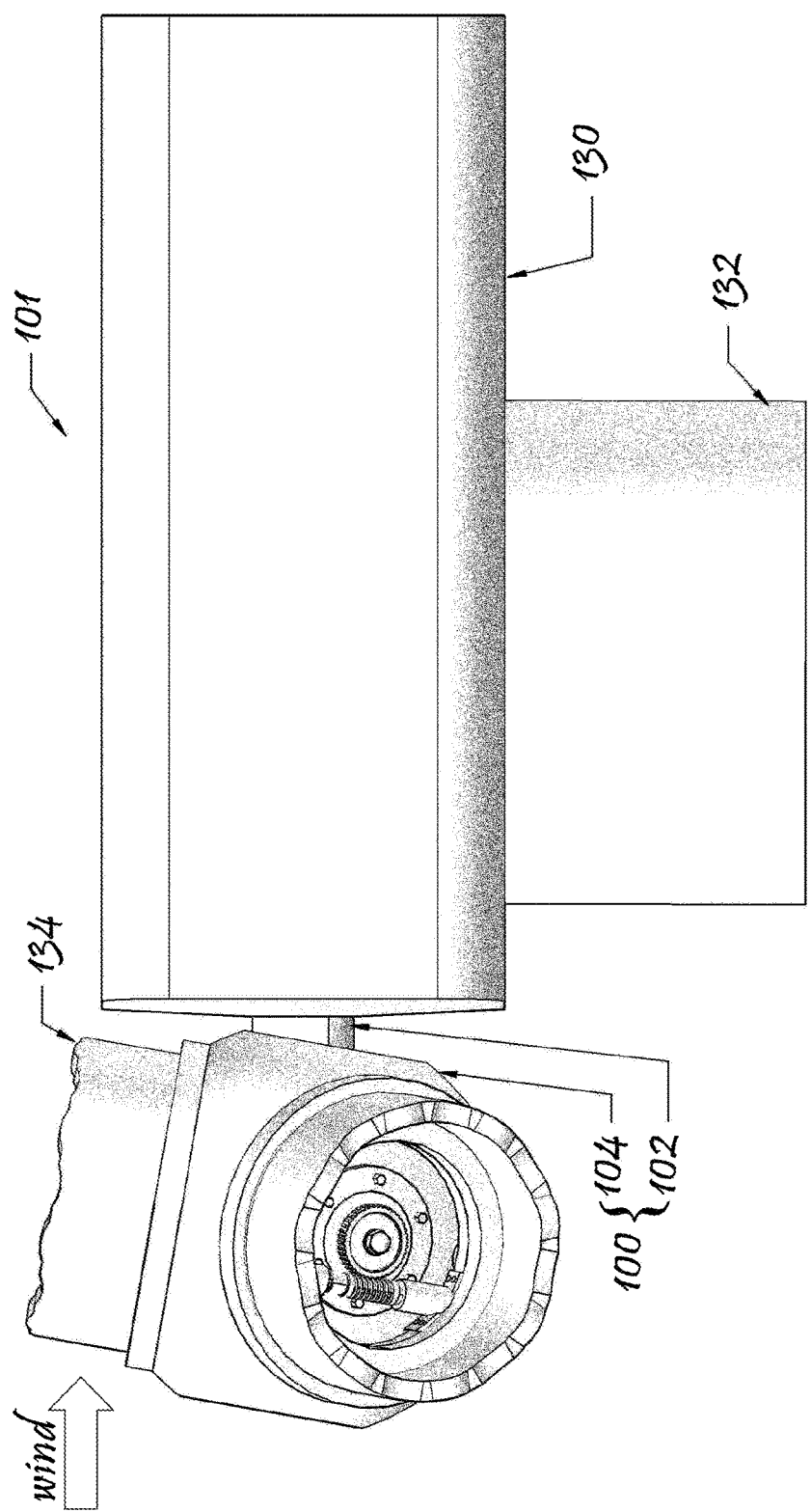
FIG. 2 is a side elevation view of a portion of a wind turbine (with turbine blades omitted) fitted with the hub assembly of FIG. 1 that is undergoing teetering.

FIG. 2 is a side elevation view of a portion of a wind turbine 101 fitted with a teetering hub assembly 100 that is undergoing teetering. As shown, the wind turbine 101 includes a nacelle 130, a vertically-aligned tower 132, turbine blades 134 coupled to the hub shell 104, and a hub shaft 102 extending between the nacelle 130 and the hub shell 104. The turbine blades 134 and the teetering hub assembly 100 in combination form a rotor of the wind turbine 101. During teetering, at least one turbine blade 134 moves forward and at least one turbine blade 134 moves backward while the rotor rotates relative to the nacelle 130. In this example, the topmost turbine blade is rotated (or tilts) backward by 10° and the two other turbine blades are rotated (or tilt) forward by 5°. During teetering, the hub shaft 102 remains oriented horizontally whereas the hub shell 104 and turbine blades 134 tilt back and forth, e.g., ±10° when oriented at different positions during rotation of the rotor. In the depiction shown in FIG. 2, the nacelle 130 and tower 132 are downstream of the rotor, such that wind impinges on the rotor before impinging on the tower 132. This is an upwind configuration that was modeled using FAST software. In a downwind configuration, the wind would come from the opposite direction of the arrow shown in FIG. 2 and impinge on the nacelle 130 and the tower 132 before impinging on the rotor. The teetering hub assembly 100 can be used in either the upwind or downwind configurations. The interior of the nacelle 130 is not shown because it does not differ from commercially-available horizontal axis wind turbines, but it is to be appreciated that the nacelle 130 preferably includes an electric generator arranged to receive torque supplied by the hub shaft 102, and that the nacelle 130 is preferably arranged to rotate relative to a vertical axis extending through the tower 132.

FIG. 3 is a perspective view of at least a portion of an inner hub member 103 that includes the hub shaft 102 with three hub shaft pivot members 140 and three hub shaft wall members 142, wherein a portion of each member 140, 142 protrudes outward in a generally radial direction from an outer surface of the hub shaft 102 and includes a curved outer surface (e.g., resembling a fin with a curved profile). Each hub shaft wall member 142 includes a lateral portion serving as a torque receiving surface 144, with the lateral portion embodying an interface between a hub shaft pivot member 140 and an adjacent hub shaft wall member 142. As shown, each hub shaft wall member 142 is substantially larger than each hub shaft pivot member 140, and the torque receiving surfaces 144 of the hub shaft wall members 142 are arranged along respective planes that intersect with a central axis of the hub shaft 102. In certain embodiments, the hub shaft wall members 142 and the hub shaft pivot members 140 may be integrally formed with the hub shaft 102 to form a continuous structure; in other embodiments, the hub shaft wall members 142 and the hub shaft pivot members 140 may be pre-fabricated and affixed to the hub shaft 102 via fasteners, adhesives, plug/aperture mating, and/or other conventional joining means (not shown). The inner hub member 103 is configured to cooperate with a subassembly as shown in FIG. 4.

FIG. 4 is a front perspective view of a subassembly of the hub assembly 100 shown in FIG. 1, including an outer hub member 105 and three rocker members 146 partially visible through an optional front opening 148 defined in the hub shell 104. When assembled, the inner hub member 103 is received within the subassembly shown in FIG. 4. The inner hub member 103, the outer hub member 105, and the hub shell 104 are not affixed; instead, the rocker members 146 fitted within hub shell 104 of the outer hub member 105 engage in sliding contact with the hub shaft pivot members 140 and are arranged to contact and transmit torque to the torque receiving surfaces 144 of the hub shaft wall members 142 of the inner hub member 103. The sliding contact between each rocker member 146 and a torque receiving surface 144 of an associated hub shaft wall member 142 enables transfer of torque from the rocker member 146 to the hub shaft 102 while permitting pivotal motion of the rocker members 146 relative to the inner hub member 103.

Figure 5:
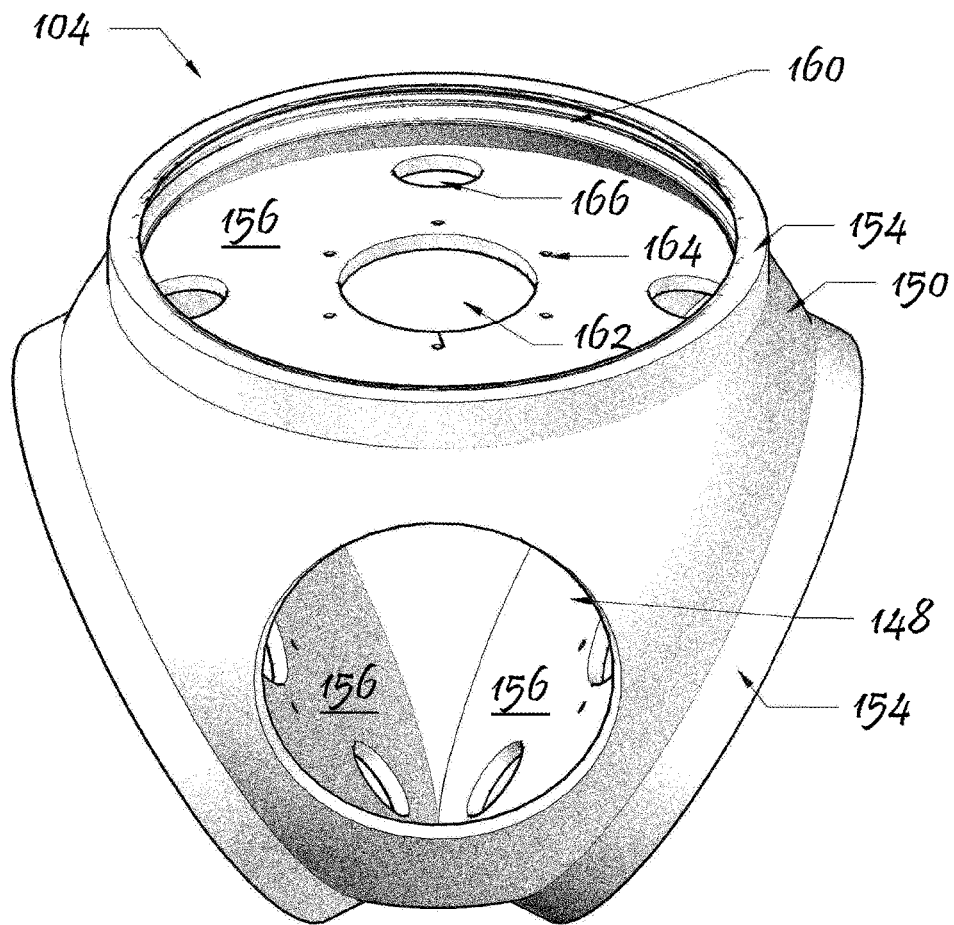
FIG. 5 is a perspective view of the hub shell shown in FIG. 4, incorporating multiple torque transfer plates.

FIG. 5 is a perspective view of the hub shell 104 shown in FIG. 4. The hub shell 104 comprises a body 150 with a front opening 148 and a back opening 106 (e.g., hub shell opening 106, shown in FIG. 1). As illustrated, the body 105 is generally spheroidal in shape, but the body 105 does not have to be spherical or even elliptical. In preferred embodiments however, the hub shell 104 should possess sufficient symmetry to assure mass balance of the rotor during in-plane rotation (i.e., power generation) and out-of-plane rotation (i.e., teetering). The hub shell 104 includes three raised lips 154 of generally cylindrical shape to accommodate turbine blade connectors 108 (shown in FIG. 1). The hub shell 104 also includes three torque transfer plates 156 each generally arranged below a large opening 160 circumscribed by a raised lip 154. Preferably, as shown in FIG. 5, the spheroidal body 150, raised lips 154 and torque transfer plates 156 in combination are formed as a single unitary member (such as by welding, adhesion, molding, or another suitable technique). Each large opening 160 interior to a cylindrical raised lip 154 is provided to accommodate a turbine blade connector 108 (as shown in FIG. 1). Similarly large openings 160 are commonly provided in conventional hubs of three-bladed wind turbines, and detrimentally reduce the strength of conventional hubs. In the case of the hub shell 104, this reduction in hub strength is virtually eliminated because torque transfer plates 156 are located within the large openings 160, with perimeter portions of each torque transfer plate 156 being in contact with interior surfaces of the spheroidal body 150, thus effectively bridging the large openings 160. Static stress studies show that addition of the torque transfer plates 156 significantly improves the ability of the hub shell 104 to withstand the very significant loads transferred from turbine blades to the hub. A rocker casing opening 162 is defined in the center of each torque transfer plate 156, and multiple rocker casing holes 164 are arranged proximate to a margin of the rocker casing opening 162. FIG. 5 also shows blade connector access holes 166 defined through each torque transfer plate 156 to enable connection of a turbine blade 134 (shown in FIG. 2) to a turbine blade connector 108 (shown in FIG. 1). In certain embodiments, the hub shell 104, the torque transfer plates 156, and the turbine blade connectors 108 in combination may comprise an outer hub member.

Figure 6:
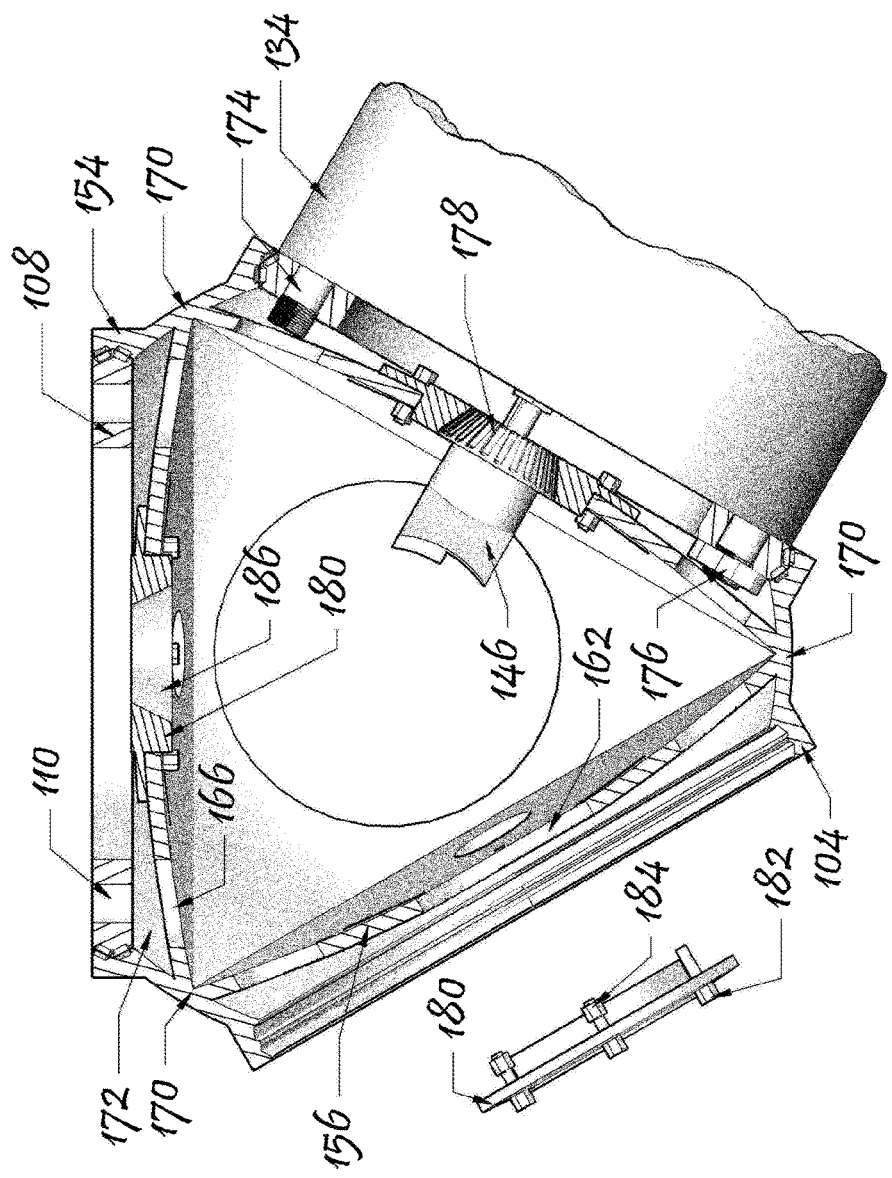
FIG. 6 is a front cross-sectional view of a portion of the subassembly shown in FIG. 4, with a portion of a turbine blade received by the outer hub member and with a single rocker member shown proximate to the turbine blade.

FIG. 6 is a front cross-sectional view of a portion of the subassembly shown in FIG. 4, with a portion of a turbine blade 134 received by the outer hub member. FIG. 6 shows that the torque transfer plates 156 form a triangle in a three-bladed embodiment such that perimeter portions of the torque transfer plates 156 are arranged adjacent to one another and merge with the spheroidal body at a junction 170. This triangular formation of the torque transfer plates 156 provides structural reinforcement and adds to the strength of the hub shell 104. FIG. 6 shows a recess or space 172 formed between a torque transfer plate 156, a turbine blade connector 108 and a raised lip 154, which is used to enable the turbine blade 134 to be affixed to the turbine blade connector 108. Connection of the turbine blade 134 to the turbine blade connector 108 is made by passing bolts 174 from the turbine blade 134 through blade connector holes 110 and by using blade fastener nuts 176 in cooperation with the bolts 174 to affix the turbine blade 134 to the turbine blade connector 108. In order to provide room to tighten the blade fastener nuts 176, one or more blade connector access holes 166 are provided in the torque transfer plates 156. FIG. 6 further shows the fitting of a rocker member 146 relative to a torque transfer plate 156. The rocker member 146 includes a rocker bearing 178 that fits within a rocker casing 180 which is in turn affixed to a torque transfer plate 156. FIG. 6 shows use of rocker casing bolts 182 and rocker casing nuts 184 to affix the rocker casing 180 to the torque transfer plate 156. The rocker casing bolts 182 pass through the rocker casing 180 and the rocker casing holes 164 (shown in FIG. 5) in the torque transfer plate 156. The rocker casing 180 also defines an opening 186 that is fitted with the rocker bearing 178. A center portion of each torque transfer plate 156 further defines a casing opening 162.

FIGS. 7-10 show more detailed views of a rocker member 146. FIG. 7 is a perspective view of the rocker member 146 primarily from the front. Each rocker member 146 includes an outer portion 187 extending through a ring gear 116 to be received by a ring gear nut 120, a central portion 188 extending through a central aperture defined in a torque transfer plate (e.g., torque transfer plate 156), and a rocker base 204 extending into the interior space of the hub shell 104. In this embodiment, the outer portion 187 of the rocker member 146 defines a rocker end shaft 190 and key 194 used for coupling with the ring gear 116 (shown in FIG. 1). The rocker end shaft 190 includes a threaded top portion 192 and a key seat (not shown) associated with an unthreaded lower portion 193, with the key 194 being arranged to fit into a keyway portion of the ring gear 116 (shown in FIG. 1). The key 194 and keyway combination represents one example of a structure that may be used to enable the rocker member 146 to turn the ring gear 116; however, other structures may be used. The central portion 188 of the rocker member 146 includes a rocker transfer region 196 and a rocker center shaft 202. An essential function of a rocker member 146 is to transfer torque from a torque transfer plate 156 (shown in FIG. 5) to the hub shaft 102 (shown in FIG. 3). Torque transfer from a torque transfer plate 156 to a rocker member 146 occurs at the rocker transfer region 196, which may include either a separate rocker bearing 178 (as shown in FIG. 6) or may include a top portion of the rocker member 146 shaped as a truncated cone 198 (having a top surface 199) and fitted with torque transfer bearings 200. The purpose in providing a top portion of the rocker member 146 in a truncated cone shape rather than a cylindrical shape is to prevent outward radial movement of the rocker member 146. Torque received by the rocker member 146 from the rocker transfer region 196 passes through the rocker center shaft 202. In order to accommodate significant torque loads, it has been found using stress studies that the strength of the rocker center shaft 202 is maximized by providing it with a length that is approximately equal to its diameter. The rocker center shaft 202 extends to a rocker base 204.

FIG. 8 is a side elevation view of the rocker member 146 including the rocker base 204, which includes a substantially flat torque transmitting surface (or wall contact surface) 206 that is configured to contact a torque receiving surface 144 of a hub shaft wall member 142 (shown in FIG. 3). FIG. 8 also shows a ring gear nut 120 that is used to fasten the ring gear 116 (shown in FIG. 1) to the rocker end shaft 190, and which is received by a threaded end of the rocker member 146. Optionally, the torque transmitting surface 206 may include multiple wall lubrication grooves 208 arranged to receive lubrication fed by a wall feed opening 210. FIG. 8 further shows the rocker center shaft 202 extending between the rocker base 204 and the rocker transfer region 196.

Figure 9:
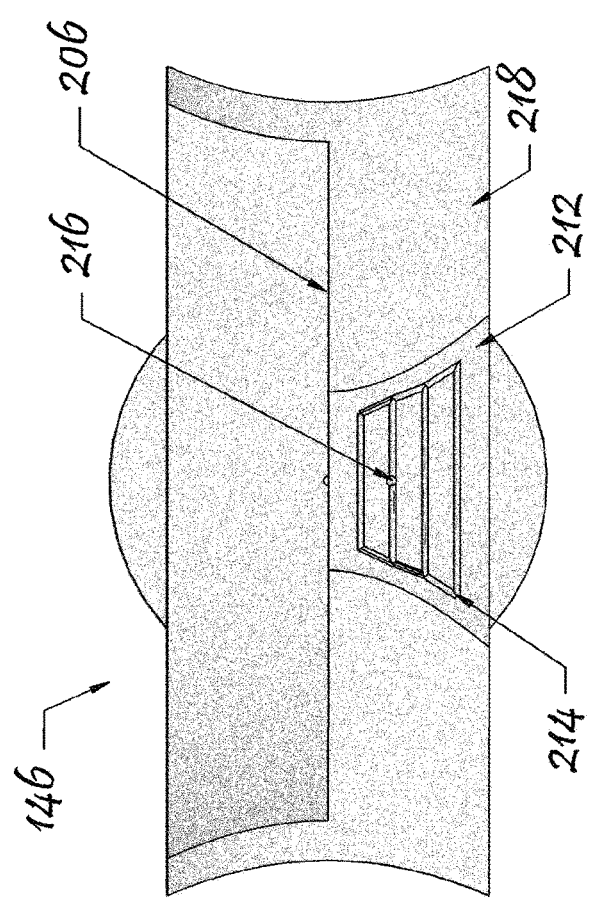
FIG. 9 is a bottom elevation view of the rocker member of FIGS. 7 and 8.

FIG. 9 is a bottom elevation view of the rocker member 146. The bottom of the rocker member 146 includes a pivot contact surface 212 that is configured to abut a hub shaft pivot member 140 (shown in FIG. 3). The pivot contact surface 212 and the hub shaft pivot member 140 (shown in FIG. 3) have corresponding curved surfaces, whereby sliding motion therebetween enables limited oscillating rotations, or teetering, of the hub assembly 100 (shown in FIG. 1). The sliding contact of the pivot contact surface 212 with a hub shaft pivot member 140 (shown in FIG. 3) also prevents inward radial movement of the rocker member 146. Optionally, the pivot contact surface 212 may include multiple pivot lubrication grooves 214 into which lubrication is fed by a pivot feed opening 216. The bottom of the rocker member also includes a hub shaft contact surface 218. Contact of the hub shaft contact surface 218 with the hub shaft 102 (shown in FIG. 1) occurs when teetering limits are reached. Generally, the hub shaft contact surface 218 would be curved to conform to the cylindrical shape of the hub shaft 102 (shown in FIG. 1). Typically, teetering limits would be approximately ±10°. FIG. 9 also shows the torque transmitting surface 206, which is configured to slide relative to contact a torque receiving surface 144 of a hub shaft wall member 142 (shown in FIG. 3).

Figure 10:
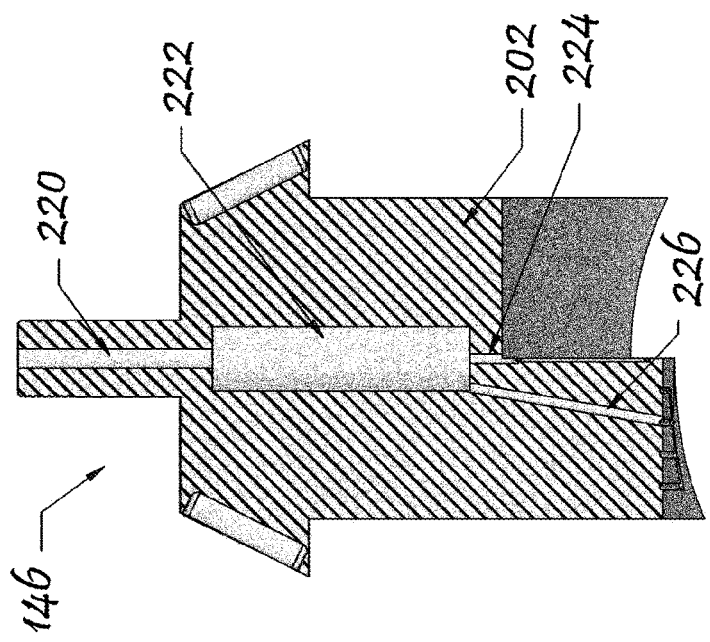
FIG. 10 is a side cross-sectional view of the rocker member of FIGS. 7-9.

FIG. 10 is a side cross-sectional view of the rocker member 146. The interior of the rocker member 146 includes a rocker lubrication passageway 220 to fill a centrally located lubrication reservoir 222 (extending into an interior of the rocker center shaft 202) that is coupled with a wall lubrication passageway 224 and a pivot lubrication passageway 226 arranged to conduct one or more suitable lubricants.

Figure 11:
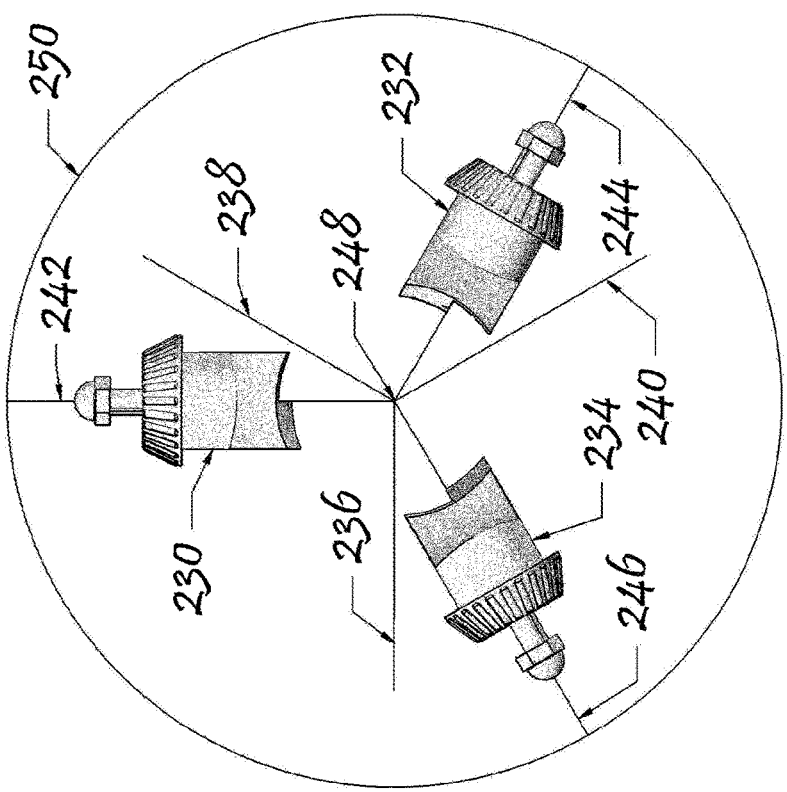
FIG. 11 is a front view of three rocker members spaced 120 degrees apart, showing alignment of the rocker members relative to pitch and teetering axes of a hub assembly.

FIG. 11 is a front view of three rocker members 230, 232, 234 spaced 120 degrees apart, showing alignment of the rocker members 230, 232, 234 with respect to three corresponding pitch axes 242, 244, 246 and three corresponding teetering axes 236, 238, 240 of a hub assembly. The rocker members 230, 232, 234 are used as an indicator for the wind or water turbine rotor because they are centrally located relative to the turbine blade connectors 108 (shown in FIG. 1), and any rotation of the rocker members 230, 232, 234 will cause the same rotation of the turbine blades operatively coupled to the turbine blade connectors 108. The relationship between a rocker member and a turbine blade is shown in FIG. 6. With continued reference to FIG. 11, each rocker member 230, 232, 234 has two allowable degrees of freedom: rotation about a teetering axis 236, 238, 240, and rotation about a pitch axis 242, 244, 246. FIG. 11 shows that all teetering axes 236, 238, 240 and all pitch axes 242, 244, 246 intersect at the same point designated the origin 248. FIG. 11 also shows that the pitch axis 242, 244, 246 for any rocker member 230, 232, 234 is perpendicular to the teetering axis 236, 238, 240 of that rocker member. For example, the pitch axis 242 is perpendicular to the teetering axis 236 for a first rocker member 230. FIG. 11 also shows a circle 250 with a center at the origin 248 that intersects each pitch axis 242, 244, 246. The purpose in constructing the circle 250 is to demonstrate that the rocker members 230, 232, 234 and corresponding turbine blades (e.g., turbine blades 134 shown in FIG. 2) form a plane that intersects the origin 248.

Figure 12:
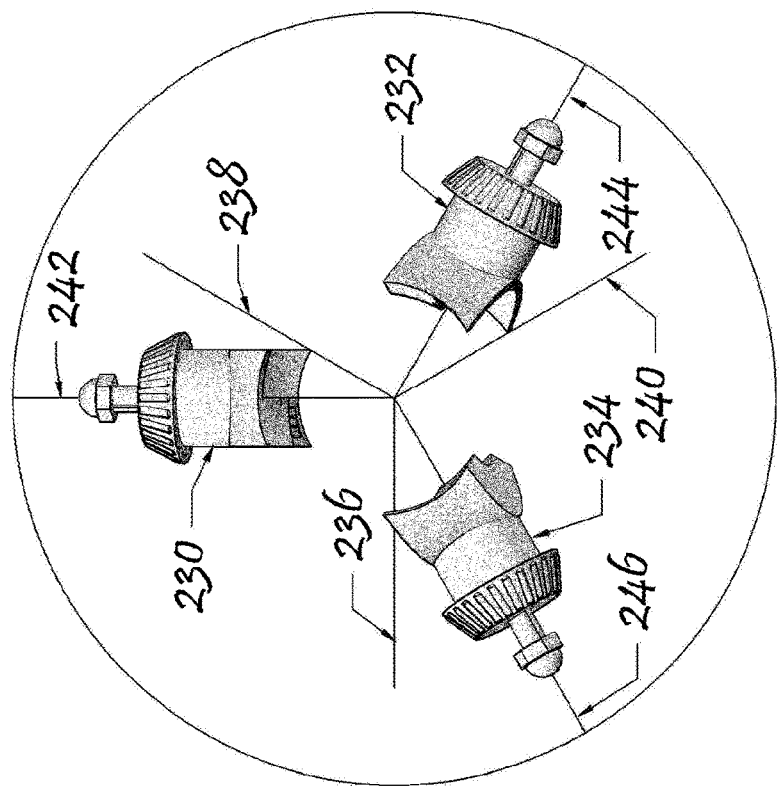
FIG. 12 is a front view of the three rocker members and pitch and teetering axes of FIG. 11 following rotation of a first rocker by ten degrees about its teetering axis with no rotation about its pitch axis.

In a two-bladed teetering hub, the two blades share a common teetering axis that is perpendicular to a common pitch axis. When axes are perpendicular, rotation about one axis has no impact upon rotation about the other. This is not the case with three-bladed teetering. Examination of FIG. 11 reveals that although the pitch axis and teetering axis are perpendicular for any given rocker member, the pitch axis of any one rocker member is not perpendicular to the teetering axes of the other two rocker members. As a consequence, rotation of one rocker member (e.g. first rocker member 230) about its teetering axis 236 will cause rotation of second and third rocker members 232, 234 about not only their teetering axes 238, 240 but also their pitch axes (244, 246). FIG. 12 is a front view of the three rocker members 230, 232, 234 and pitch and teetering axes of FIG. 11, showing an example where a CAD program was used to rotate the first rocker member 230 by 10° about its teetering axis 236 with no rotation about its pitch axis 242. As a result, the second and third rocker members 232, 234 exhibit rotation about both their teetering axes 238, 240 and pitch axes 244, 246. Here, the second rocker member 232 rotates −5°, or 10° sin 210° about its teetering axis 238 and rotates 8.66°, or 10° cos 210° about its pitch axis 244. The third rocker member 234 rotates −5° about its teetering axis 240 and −8.66° about its pitch axis 246. Visual comparison of the second and third rocker members 232, 234 in FIG. 12 with the same rocker members in FIG. 11 shows differences in orientation consistent with rotation about the pitch axes 244, 246. It is undesirable for pitch axis rotation to accompany teetering axis rotation for a three-bladed, teetering wind turbine because an unstable resonance will likely occur. In such a situation, teetering will lead to differences in pitch angle among the turbine blades and these differences in pitch angle will in turn lead to a further increase in teetering.

Figure 13:
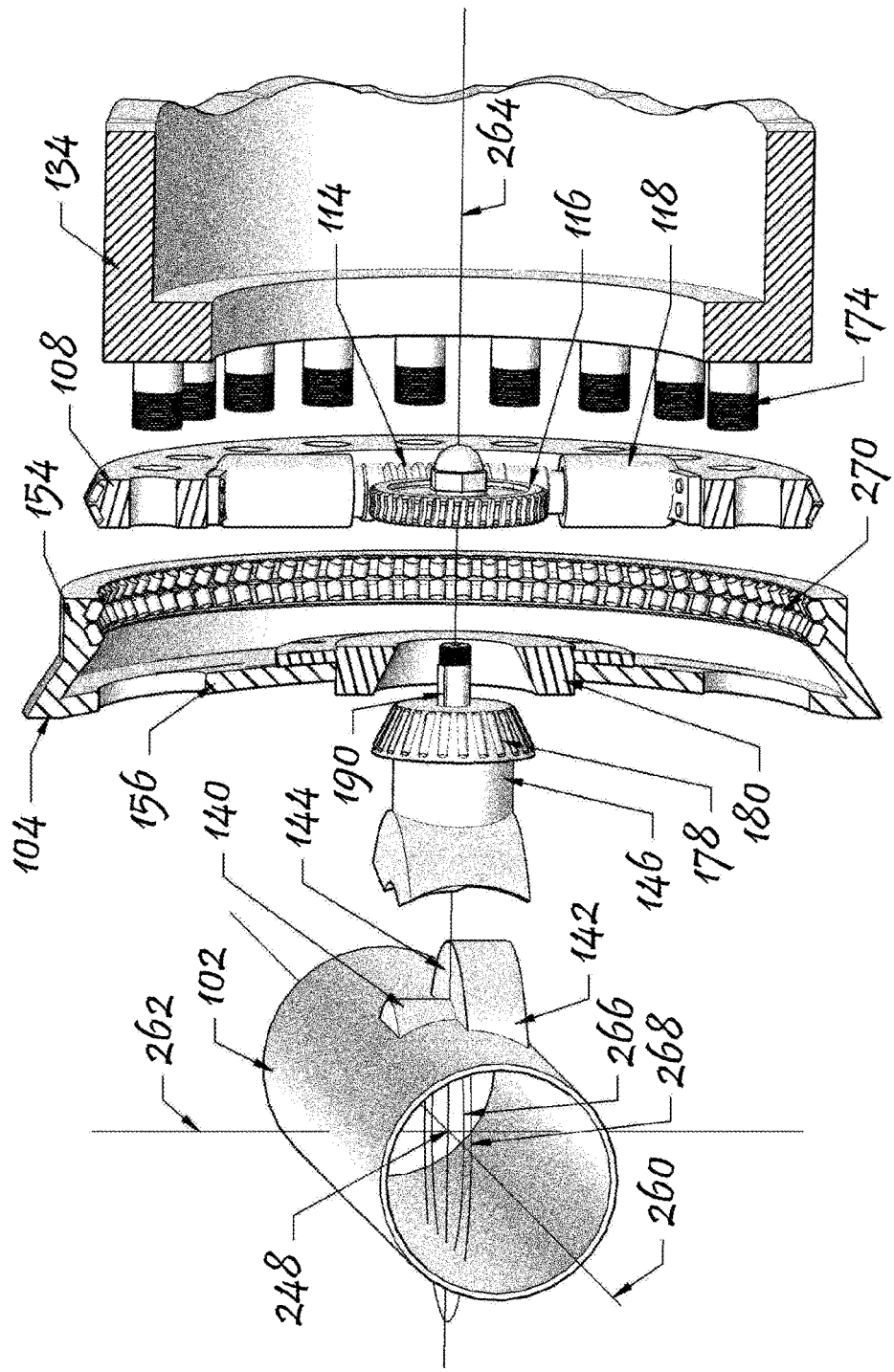
FIG. 13 is a partial cross-sectional exploded view of a portion of a hub assembly configured to receive a turbine blade, with superimposed circular lines representing an extension of a curved outer surface of a hub shaft wall member associated with the hub shaft.

FIG. 13 is a partial cross-sectional exploded view of a portion of a hub assembly configured to receive a turbine blade 134 of a horizontal axis, fluid-driven turbine generator, with the hub assembly being designed to allow teetering of turbine blades while preventing the accompanying pitch axis rotations. As illustrated, a hub shaft 102 has been modified (e.g., thinned) to permit illustration of imaginary lines extending through its interior. FIG. 13 further illustrates an origin 248 that is intersected by a hub shaft axis 260, a teetering axis 262, and a pitch axis 264. During teetering, the teetering axis 262 remains perpendicular to both the pitch axis 264 and the hub shaft axis 260; however the pitch axis 264 does not remain perpendicular to the hub shaft axis 260. The teetering axis 262 is defined by a hub shaft pivot member 140 that is affixed to the hub shaft 102. The hub shaft pivot member 140 is provided with a curved shape that embodies a shape constituting a portion of a first imaginary cylinder having a center at the origin 248 and having sides aligned with the hub shaft axis 260. This defines the teetering axis 262 that intersects the origin 248 and is perpendicular to the hub shaft axis 260. This is demonstrated in FIG. 13 by construction of a first circle 266 having the same diameter as the hub shaft pivot member 140, with the first circle 266 also centered at the origin 248. FIG. 13 also shows a hub shaft wall member 142 that is provided with a curved surface that embodies a shape constituting a portion of a second imaginary cylinder having a center at the origin 248. This is demonstrated by constructing a second circle 268 with a center at the origin 248 and with the same diameter as the hub shaft wall member 142. The second circle 268 has a larger diameter than the first circle 266, such that the curved surface of the hub shaft wall member 142 has a larger radius than the curved surface of the hub shaft pivot member 140. The orientation of the hub shaft pivot member 140 and the hub shaft wall member 142 with respect to the hub shaft 102 is also shown in FIG. 13. The first circle 266 and the second circle 268 intersect the hub shaft axis 260 at both the front and back, indicating that the sides of the hub shaft pivot member 140 and the hub shaft wall member 142 are aligned with the hub shaft axis 260. It is possible for the hub shaft pivot member 140 and hub shaft wall member 142 to have non-cylindrical shapes in certain embodiments; however, it is preferred for the two members 140, 142, either individually or in combination, to define the teetering axis 262 that intersects the origin 248 and that is perpendicular to the hub shaft axis 260. A rocker member 146 also shares the same teetering axis 262 because the rocker member 146 has a curved pivot contact surface 212 (shown in FIG. 9) with a concave curvature that conforms to the convex curvature of the hub shaft pivot member 140. FIG. 13 also illustrates the pitch axis 264 that extends through a center of the rocker member 146 and rotates with the rocker member 146 about the teetering axis 262. As shown, the pitch axis 264 also extends through a center of each of a rocker bearing 178, rocker casing 180, torque transfer plate 156, hub shell 104, raised lip 154, turbine blade connector 108, ring gear 116, a collection of blade bolts 174, and turbine blade 134. As shown, an interior surface of the raised lip 154 includes a blade connector bearing 270 arranged to receive and permit rotation of a peripheral edge of the turbine blade connector 108, with the turbine blade connector bearing 270 also being centered on the pitch axis 264. The foregoing parts 146, 178, 180, 156, 104, 154, 270, 108, 116, 174, 134 are arranged in alignment, with the pitch axis 264 extending through a center axis of each part (or assembly of parts) and the origin 248. Additionally, since the pitch axis 264 and the first circle 266 are both centered at the origin 248, the pitch axis 264 will remain perpendicular to the teetering axis 262 during rotation about the pitch axis 264. Because of this alignment, parts 146, 178, 180, 156, 104, 154, 270, 108, 116, 174, 134 also rotate about the teetering axis 262 along with the rocker member 146. Fitting of the rocker bearing 178 within the rocker casing 180 and torque transfer plate 156 enables the rocker member 146 to freely rotate about the pitch axis 264 within the hub shell 104 while teetering. The rocker member 146 and the turbine blade connector 108 are connected because both are affixed to a slewing drive 112 (shown in FIG. 1). As shown in FIG. 1, the ring gear 116 is affixed to the rocker end shaft 190, and the worm gear 114 is affixed to the turbine blade connector 108 via the worm support 118. With continued reference to FIG. 13, the turbine blade connector 108 is enabled to rotate smoothly within the raised lip 154 by contact with the blade connector bearing 270. Referring back to FIG. 1, the slewing drive 112 provides for rotation of the turbine blade connector 108 when the worm gear 114 is not rotating because the teeth of the worm gear 114 are fixed and mesh with the teeth of the ring gear 116. The turbine blade 134 is affixed to the turbine blade connector 108. The turbine blade connector 108 and the turbine blade 134 rotate with the rocker member 146 about the pitch axis 264, while also pivoting with the rocker member 146 about the teetering axis 262. There is no stop to limit the pitch axis rotation of the rocker member 146 and the turbine blade 134; however, limiting the teetering rotation (e.g., in a range within about ±10° would also limit the pitch axis rotation to approximately the same amount. Turning on the slewing drive 112 (shown in FIG. 1) and rotating the worm gear 114 causes an additional rotation of the turbine blade connector 108 and turbine blade 134 about the pitch axis 264 without causing the rocker member 146 to undergo the same rotation about the pitch axis 264. This enables a desired change in pitch angle of the turbine blade 134. Finally, the rocker member 146 is designed to maintain the same orientation as the hub shaft axis 260 because a torque transmitting surface 206 (shown in FIG. 8) is in sliding contact with a torque receiving surface 144 of the hub shaft wall member 142. This contact ensures that the rocker member 146 and the turbine blade connector 108 remain oriented along the hub shaft axis 260. FIG. 12 shows how teetering would ordinarily cause rotation about pitch axes 242, 244, 246 for a three-bladed wind turbine; however, this pitch axis rotation is prevented in the assembly of FIG. 13 by a combination of (i) ensuring that each rocker member and corresponding turbine blade connector remain oriented along a hub shaft axis and (ii) enabling each rocker member and corresponding blade connector to counter-rotate about their pitch axis while teetering. This combination is beneficial for operation of a three-bladed teetering hub.

In FIGS. 14 and 15, the rocker members 230, 232, 234 are rotated about their respective teetering axes 236, 238, 240 (shown in FIG. 14) in the same general manner as described in FIG. 12; however, each rocker member 230, 232, 234 is forced to remain aligned along the hub shaft axis 260 (shown in FIG. 15). In order to promote such alignment, the rocker members 230, 232, 234 were enabled to rotate about their respective pitch axes 242, 244, 246 within a hub shell 104 (as shown in FIG. 4). FIGS. 14 and 15 show pitch axes 242, 244, 246 for a first rocker member 230, a second rocker member 232, and a third rocker member, 234 respectively. FIG. 14 shows teetering axes 236, 238, 240 for the first, second, and third rocker members 230, 232, 234. Comparison of FIG. 14 with FIG. 12 shows that the change in pitch angle of the second and third rocker members 232, 234 visible in FIG. 12 does not occur in FIG. 14. FIG. 15 is a perspective view of the three rocker members 230, 232, 234 and pitch axes 242, 244, 246 of FIG. 14, where a 10° rotation of the first rocker member 230 and a −5° rotation of the second and third rocker members 232, 234 are evident. FIG. 15 also illustrates a circle 250 that intersects each pitch axis 242, 244, 246 and has its center at an origin 248. This demonstrates that the rocker members 230, 232, 234 (and associated turbine blades) maintain a planar formation during teetering and that this plane intersects the origin 248. FIG. 2 shows a side view of a portion of a wind turbine in which a hub assembly undergoes the same teetering during rotational operation.

In certain embodiments, a hub shaft pivot member according to an alternative design may define a torque receiving surface (thereby embodying a 'unified' hub shaft pivot member), such that the need for a separate hub shaft wall member may be eliminated. In such an instance, a rocker member may be configured to engage in sliding contact with a curved surface of the hub shaft pivot member, and also configured to transmit torque to the hub shaft pivot member. Elimination of separate hub shaft wall members reduces complexity in fabricating an inner hub member, and also provides additional space between adjacent hub shaft pivot members.

Figure 16:
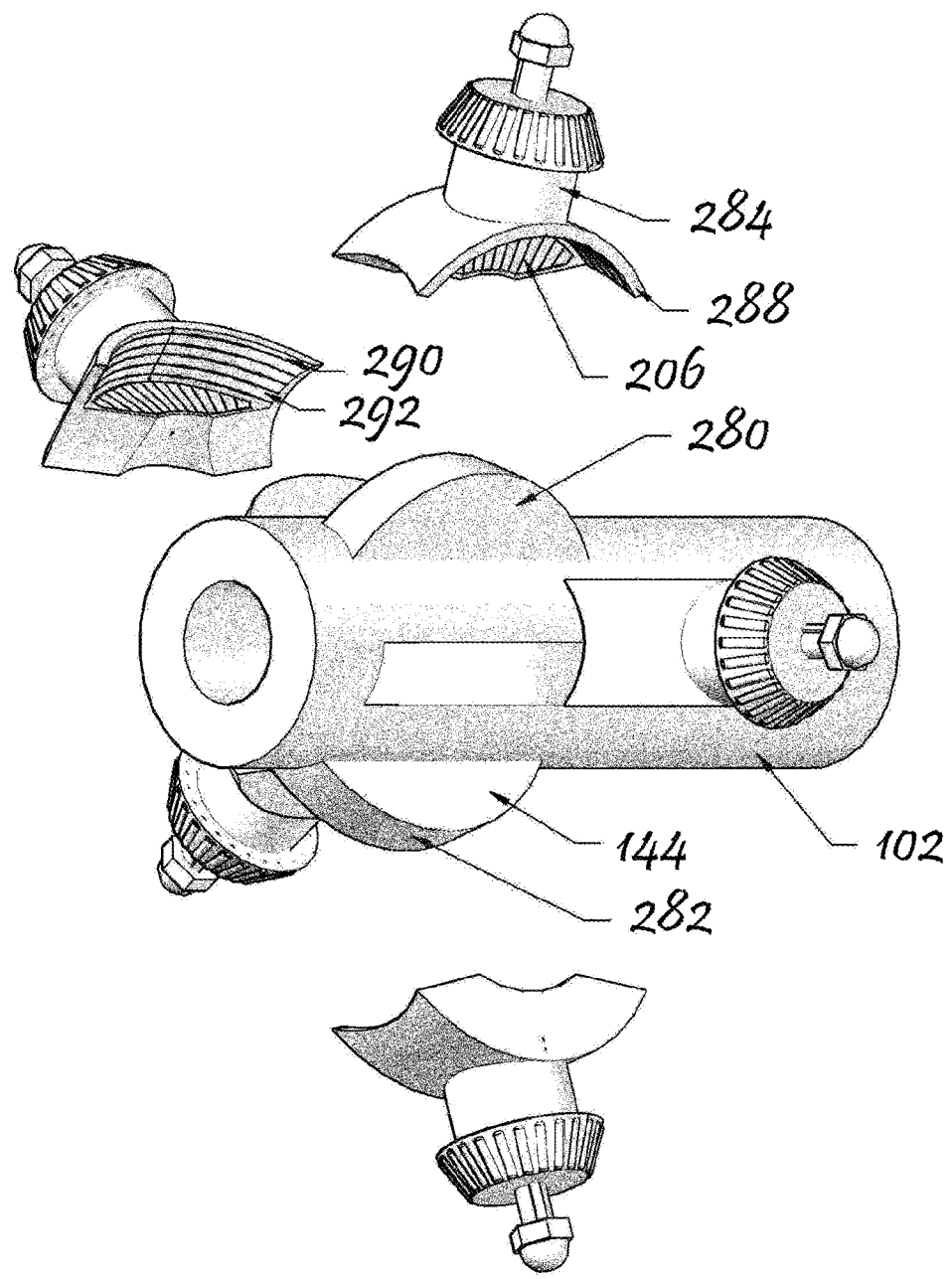
FIG. 16 is a perspective, partial assembly view of a hub shaft with five alternative hub shaft pivot members each including a torque receiving surface and with five alternative rocker members.

FIG. 16 is a perspective, partial assembly view of a hub shaft 102 with five alternative hub shaft pivot members 280 arranged to cooperate with five alternative rocker members 284. Each hub shaft pivot member 280 includes a torque receiving surface 144 and a curved upper surface 282, and embodies a 'unified' hub shaft pivot member design. The five alternative rocker members 284 are arranged to contact and pivot relative to the hub shaft pivot members 280. A base portion of each rocker member 284 includes a curved extension 288 at the top. The curved extension 288 has a curved lower surface 290 that permits the rocker member 284 to slide along an arcuate path relative to the curved upper surface 282 of a corresponding hub shaft pivot member 280, enabling limited oscillating rotations, or teetering, of a hub assembly incorporating the hub shaft 102, hub shaft pivot members 280, and rocker members 284. As shown in FIG. 16, the curved lower surface 290 of each rocker member 284 may include multiple lubrication grooves 292 to reduce friction when the curved lower surface 290 is engaged in sliding contact relative to the curved upper surface 282 of a hub shaft pivot member 280. Such sliding contact is in contrast to the rocker member 146 shown in FIG. 7, which need not contact a curved upper surface of hub shaft wall member 142 due to the presence of a separate hub shaft pivot member 140. With continued reference to FIG. 16, each rocker member 284 includes a torque transmitting surface (or wall contact surface) 206 that engages in sliding contact with the torque receiving surface 144 of a corresponding hub shaft pivot member 280, thereby facilitating transfer of torque between a hub shaft pivot member 280 and the hub shaft 102 while permitting the rocker members 284 (and corresponding turbine blades coupled thereto) to teeter.

An advantage of the configuration shown in FIG. 16 is that the need for hub shaft wall members separate from hub shaft pivot members is eliminated, thereby allowing for more space between neighboring hub shaft pivot members 280. A potential disadvantage of the configuration shown in FIG. 16, however, is that an increase in the radius of a hub shaft pivot member 280 will increase the travel distance of a corresponding rocker member 284 over the hub shaft pivot member 282. Although five hub shaft pivot members 280 and five rocker members 284 (each configured for coupling to a different turbine blade) are shown in FIG. 16, it is to be appreciated that the design may be used with any suitable number of two or more turbine blades.

In certain embodiments, a flexible hub protector may be provided to seal an interior of a hub assembly relative to a surrounding environment, such as may be useful when a turbine incorporating the hub assembly is used in an aqueous environment.

Figure 17:
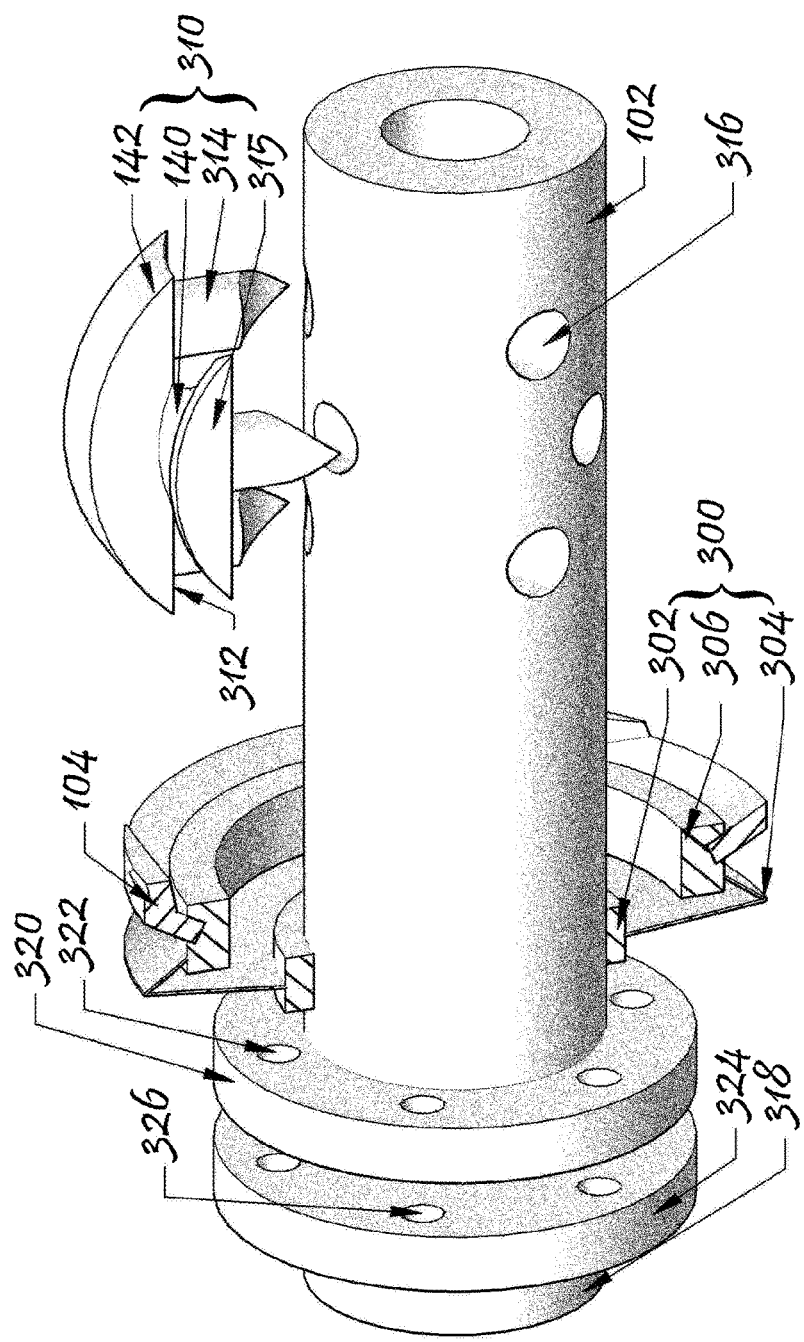
FIG. 17 is a perspective partial assembly view of an optional flexible hub protector, flanges for connecting a hub shaft to a main shaft, and multiple plug-in cylinders for affixing a hub shaft insert member to the hub shaft.

FIG. 17 is a perspective, partial assembly view of an optional flexible hub protector 300, flanges 320, 324 for connecting a hub shaft 102 to a main shaft 318, and multiple plug-in cylinders 314 for affixing a hub shaft insert member 310 (including a hub shaft pivot member 140 and a hub shaft wall member 142) to the hub shaft 102. The flexible hub protector 300 is configured to be affixed to the hub shaft 102 and a hub shell 104 at a hub shell opening (e.g., hub shell opening 106 as shown in FIG. 1). The flexible hub protector 300 includes a hub shaft ring 302, a flexible, impermeable membrane 304, and a hub shell connector ring 306. This flexible hub protector 300 in combination with a nose cone (not shown) is suitable to protect the interior of a hub assembly from the environment, such as may be useful when the hub assembly is operated in an aqueous environment to keep water out of an interior of a turbine hub. FIG. 17 also shows the hub shaft insert member 310 that includes the hub shell pivot member 140, the hub shell wall member 142, the plug-in cylinders 314, and an optional rotation preventer 315. Rotation of a turbine rotor (e.g., including turbine blades 134 and a teetering hub assembly 100 disclosed herein) should only occur in one (e.g., forward) direction; however, as a safety measure, a rotation preventer 315 may be provided to prevent the possibility of rocker members 146 as disclosed herein rotating in a backward direction and thereby separating from the inner hub member 103 (e.g., including hub shaft pivot members 140 as disclosed herein). The hub shaft insert member 310 includes an inner surface 312 with substantially the same curvature as an outer surface of the hub shaft 102, and the plug-in cylinders 314 are arranged to fit within a matching series of shaft insert holes 316 defined in the hub shaft 102. FIG. 17 also shows the hub shaft 102 as including the flange 320 at one (e.g., interior) end with multiple hub shaft flange holes 322. The main shaft 318 includes the flange 324 at one (e.g., exterior) end with multiple main shaft flange holes 326. When the (hub shaft) flange holes 322 are registered with the (main shaft) flange holes 326, bolts (not shown) may be inserted through these holes 322, 326 and secured with nuts (not shown) to couple the (hub shaft) flange 320 to the (main shaft) flange 324, thereby mechanically engaging the hub shaft 102 and the main shaft 318.

Figure 18:
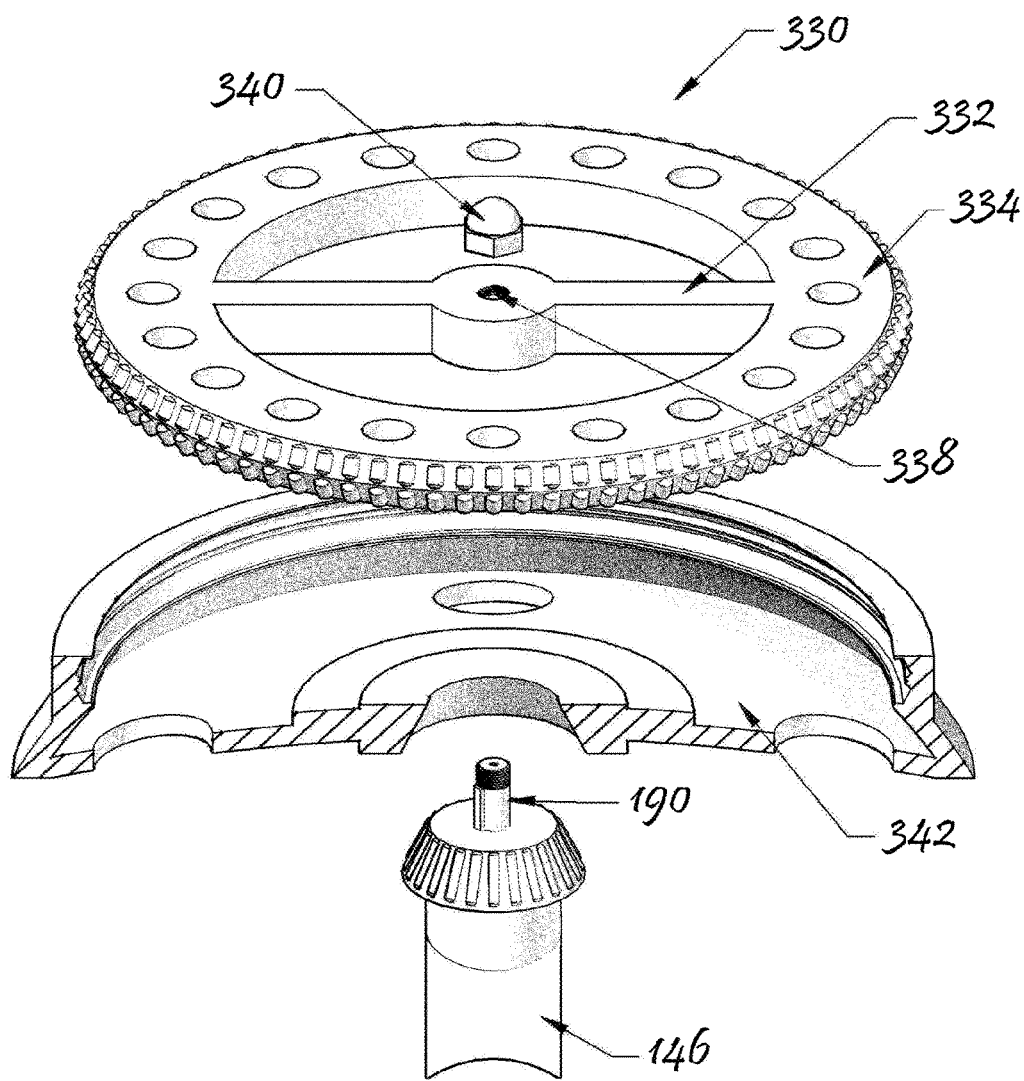
FIG. 18 is a perspective assembly view showing an alternative fixed-pitch blade connector and an alternative torque transfer plate.

FIG. 18 is a perspective assembly view of an alternative, fixed-pitch blade connector 330 and an alternative torque transfer plate 342. In this embodiment, the fixed-pitch blade connector 330 includes a cross support 332 that provides a direct connection between a rocker member 146 and a blade connector 334. Connection to the rocker member 146 is made by fitting a rocker end shaft 190 into a cross support hole 338 arranged at the center of the cross support 332, and capping the rocker end shaft 190 with a rocker shaft nut 340. This configuration may be suitable for use with small wind and water turbines in which the pitch angle is fixed. The alternative torque transfer plate 342 shown in FIG. 18 combines the functions of the torque transfer plate 156 and rocker casing 180 shown in FIG. 6, and may be applied to any embodiment disclosed herein.

Those skilled in the art will recognize improvements and modifications to the preferred embodiments of the present disclosure. All such improvements and modifications are considered within the scope of the concepts disclosed herein and the claims that follow.

The invention claimed is:

1. A hub assembly for use with a horizontal axis, fluid-driven turbine generator, the hub assembly comprising:
   an outer hub member including a hub shell incorporating a plurality of torque transfer plates and including a plurality of turbine blade connectors, wherein each turbine blade connector of the plurality of turbine blade connectors is configured to receive a turbine blade;
   an inner hub member comprising a hub shaft, a plurality of hub shaft pivot members protruding outward from an outer surface of the hub shaft, and a plurality of torque receiving surfaces, wherein: the hub shaft is configured to transmit torque to promote rotation of the generator of a horizontal axis, fluid-driven turbine; each torque receiving surface of the plurality of torque receiving surfaces is arranged along a different plane of a plurality of intersecting planes extending through a central longitudinal axis of the hub shaft, each hub shaft pivot member of the plurality of hub shaft pivot members includes a curved outer surface, and each hub shaft pivot member and each torque receiving surface is arranged within an interior of the outer hub member; and
   a plurality of rocker members, wherein each rocker member of the plurality of rocker members includes (i) an outer portion arranged to couple with a corresponding turbine blade connector of the plurality of turbine blade connectors, (ii) a central portion arranged to extend through a central aperture defined in a respective torque transfer plate of the plurality of torque transfer plates, and (iii) a rocker base arranged to extend into the interior of the outer hub member, wherein the rocker base of each rocker member comprises a first curved contact surface configured to abut a curved outer surface of a corresponding hub shaft pivot member of the plurality of hub shaft pivot members, and comprises a torque transmitting surface arranged to abut a torque receiving surface of the plurality of torque receiving surfaces of the inner hub member;
   wherein the plurality of rocker members is configured to cooperate with the inner hub member to permit the outer hub member to teeter relative to the hub shaft while torque is transmitted from the outer hub member via the plurality of rocker members to the inner hub member.

2. The hub assembly of claim 1, wherein lateral portions of the plurality of hub shaft pivot members define the plurality of torque receiving surfaces.

3. The hub assembly of claim 1, wherein the curved outer surface of each hub shaft pivot member embodies a shape constituting a portion of an imaginary cylinder having a center, and each center intersects the central longitudinal axis at a single origin point.

4. The hub assembly of claim 1, wherein the inner hub member further comprises a plurality of hub shaft wall members that protrudes outward from the outer surface of the hub shaft, wherein each hub shaft wall member of the plurality of hub shaft wall members includes a lateral portion defining a torque receiving surface of the plurality of torque receiving surfaces, and each hub shaft wall member includes a curved outer surface that is configured to abut a second curved contact surface of a different rocker member of the plurality of rocker members.

5. The hub assembly of claim 4, wherein each first curved contact surface is arranged to slide relative to a curved outer surface of a corresponding hub shaft pivot member, and each second curved contact surface is arranged to slide relative to a curved outer surface of a corresponding hub shaft wall member, to enable each rocker member to rotate along a teetering axis to permit the outer hub member to teeter relative to the hub shaft.

6. The hub assembly of claim 4, wherein the curved outer surface of each hub shaft pivot member embodies a shape constituting a portion of a first imaginary cylinder having a first center, the curved outer surface of each hub shaft wall member embodies a shape constituting a portion of a second imaginary cylinder having a second center, and each of the first center and the second center intersects the central longitudinal axis at a single origin point.

7. The hub assembly of claim 4, wherein the curved outer surface of each hub shaft wall member has a larger radius than the curved outer surface of each hub shaft pivot member.

8. The hub assembly of claim 4, wherein the curved outer surface of each hub shaft pivot member is arranged to receive, and comprises a slightly greater radius of curvature than, a corresponding first curved contact surface, and the curved outer surface of each hub shaft wall member is arranged to receive, and comprises a slightly greater radius of curvature than, a corresponding second curved contact surface.

9. The hub assembly of claim 4, wherein each torque receiving surface embodies a transition between a hub shaft wall member of the plurality of hub shaft wall members and a hub shaft pivot member of the plurality of hub shaft pivot members.

10. The hub assembly of claim 4, wherein:
   the plurality of torque transfer plates includes at least three torque transfer plates,
   the plurality of turbine blade connectors includes at least three turbine blade connectors,
   the plurality of hub shaft pivot members comprises at least three hub shaft pivot members,
   the plurality of hub shaft wall members comprises at least three hub shaft wall members, and
   the plurality of rocker members includes at least three rocker members.

11. The hub assembly of claim 1, wherein:
   each rocker member is associated with a corresponding turbine blade connector of the plurality of turbine blade connectors;
   for each rocker member and corresponding turbine blade connector, a pitch axis extends through a center of the rocker member and the corresponding turbine blade connector, whereby each pitch axis differs from each other pitch axis of each other rocker member and corresponding turbine blade connector; and
   each pitch axis extends through an origin point arranged within an interior of the hub shaft.

12. The hub assembly of claim 11, wherein each torque transfer plate of the plurality of torque transfer plates is affixed to the hub shell, each turbine blade connector of the plurality of turbine blade connectors is arranged proximate to a corresponding torque transfer plate of the plurality of torque transfer plates, and each turbine blade connector is arranged to rotate relative to the hub shell about a pitch axis of the corresponding torque transfer plate.

13. The hub assembly of claim 1, wherein the hub shell includes a rear opening having a first diameter, a portion of the hub shaft extends through the rear opening and has a second diameter, and the first diameter is sufficiently greater than the second diameter so as to permit the outer hub member to teeter relative to the hub shaft without impacting the hub shaft.

14. The hub assembly of claim 1, further comprising a plurality of rocker bearings associated with the plurality of rocker members, wherein each rocker bearing is arranged within a central aperture of a different torque transfer plate of the plurality of torque transfer plates, and each rocker bearing is interposed between a central aperture of a corresponding torque transfer plate and a rocker member of the plurality of rocker members to permit rotation of the rocker member relative to the corresponding torque transfer plate.

15. The hub assembly of claim 1, further comprising a plurality of slewing drive mechanisms, wherein each slewing drive mechanism of the plurality of slewing drive mechanisms is associated with a different turbine blade connector of the plurality of turbine blade connectors to control rotation of the turbine blade connector relative to a rocker member of the plurality of rocker members associated with the turbine blade connector to effectuate a change in pitch angle of a turbine blade coupled to the turbine blade connector.

16. The hub assembly of claim 15, wherein each slewing drive mechanism includes a ring gear affixed to the rocker member and includes a worm gear affixed to the turbine blade connector associated with the rocker member, wherein the worm gear is configured to engage the ring gear.

17. The hub assembly of claim 1, wherein each turbine blade connector of the plurality of turbine blade connectors is fitted with one or more cross supports that provide direct connection to a rocker end shaft.

18. The hub assembly of claim 1, wherein the hub shell includes a plurality of raised lips, each raised lip of the plurality of raised lips is arranged proximate to a different torque transfer plate of the plurality of torque transfer plates, and each raised lip is arranged to receive a portion of a turbine blade.

19. The hub assembly of claim 1, wherein each torque transmitting surface is arranged to slide relative to an abutting torque receiving surface.

20. The hub assembly of claim 1, wherein each rocker member comprises a hub shaft contact surface that substantially conforms to a curvature of the hub shaft and serves to limit a degree of teetering of the outer hub member relative to the hub shaft.

21. The hub assembly of claim 1, wherein each rocker member comprises a lubricant reservoir and at least one of the following features (a) or (b): (a) a plurality of grooves arranged on the torque transmitting surface and configured to receive lubricant from the lubricant reservoir via a wall lubrication passage; or (b) a plurality of grooves on a pivot contact surface and configured to receive lubricant from the lubricant reservoir via a pivot lubrication passage.

22. The hub assembly of claim 1, wherein each rocker member and corresponding turbine blade connector remain oriented along a hub shaft axis, and each rocker member and corresponding turbine blade connector are permitted to rotate about a corresponding pitch axis, during teetering of the outer hub member relative to the hub shaft.

23. The hub assembly of claim 1, further comprising a flexible hub protector affixed to the hub shaft and the hub shell to prevent ingress of liquid into the interior of the outer hub member.

24. A water turbine comprising the hub assembly of claim 23.

25. A wind turbine comprising the hub assembly of claim 1.

* * * * *